US012719515B2

(12) United States Patent
Moses et al.

(10) Patent No.: US 12,719,515 B2
(45) Date of Patent: Aug. 25, 2026

(54) ADAPTIVE PA ORDER MODELING BASED ON INSTANTANEOUS SNR AND RX DIVERSITY ORDER

(71) Applicant: QUALCOMM Incorporated, San Diego, CA (US)

(72) Inventors: Amit Moses, Tel Aviv (IL); Ronen Shaked, Kfar Saba (IL); Aviv Regev, Tel Aviv (IL); Yaniv Eistein, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 18/598,704

(22) Filed: Mar. 7, 2024

(65) Prior Publication Data

US 2025/0286568 A1 Sep. 11, 2025

(51) Int. Cl.
*H04B 1/04* (2006.01)
*H04L 5/00* (2006.01)

(52) U.S. Cl.
CPC ......... *H04B 1/0475* (2013.01); *H04L 5/0048* (2013.01); *H04B 2001/0408* (2013.01)

(58) Field of Classification Search
CPC .......... H04B 1/0475; H04B 2001/0408; H04L 5/0048
See application file for complete search history.

(56) References Cited

U.S. PATENT DOCUMENTS

2022/0337199 A1* 10/2022 Constantin ............ H03F 1/0227
2023/0361722 A1* 11/2023 Chen .......................... H03F 3/24
2024/0243838 A1* 7/2024 Farhadi ................ H04B 1/0475
2024/0291508 A1* 8/2024 Hamid ...................... H04B 1/04

* cited by examiner

*Primary Examiner* — Christopher M Brandt
(74) *Attorney, Agent, or Firm* — QUALCOMM Incorporated

(57) ABSTRACT

Methods, systems, and devices for wireless communications are described. A component of a user equipment (UE) may experience non-linearity behavior. Using a digital post distortion (DPOD) process, the UE may estimate non-linear distortion caused by the non-linearity behavior and may use the estimated non-linear distortion to cancel or mitigate distortion at a received downlink signal. To improve the non-linear distortion estimation, a network entity may determine and transmit to the UE recommended kernel set sizes to use at a DPOD algorithm of the DPOD process. The recommended kernel set sizes may be based on a quantity of receive antenna in use at the UE and an instantaneous SNR measurement at the UE. The UE may utilize one of the recommended kernel set sizes in performing the DPOD process on a received downlink signal to mitigate or cancel the non-linear distortion.

30 Claims, 16 Drawing Sheets

Receive, from a UE, first information indicating a capability for adaptive power amplifier (PA) order modeling based on instantaneous signal to noise ratio (SNR)

1505

Transmit, to the UE and based on the first information, second information indicating a set of recommended kernel set size associations, where the set of recommended kernel set size associations include one or more associations between a quantity of receive antennas, a SNR threshold, and a kernel set size

1510

1500

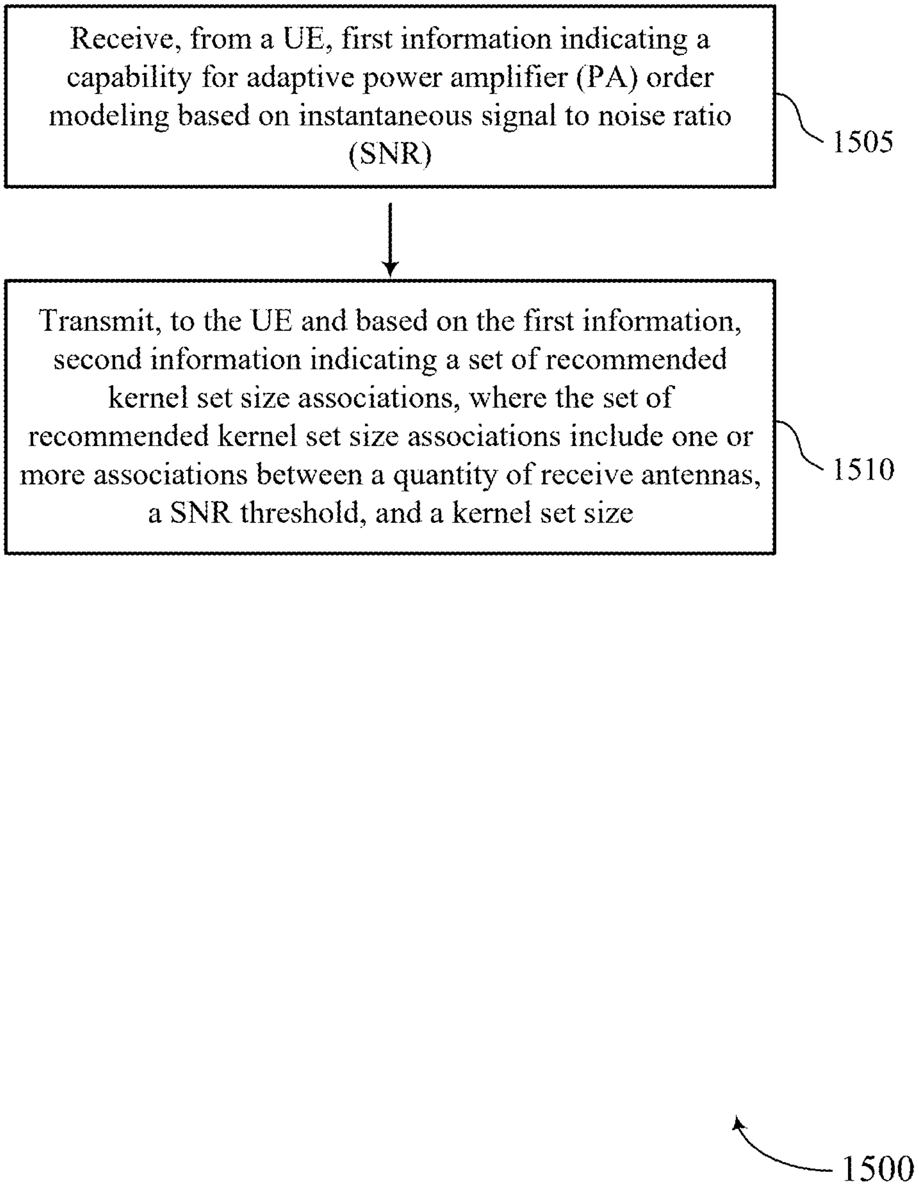

FIG. 15

ADAPTIVE PA ORDER MODELING BASED ON INSTANTANEOUS SNR AND RX DIVERSITY ORDER

FIELD OF TECHNOLOGY

The following relates to wireless communications, including adaptive power amplifier (PA) order modeling based on instantaneous signal-to-noise ratio (SNR) and receive (Rx) diversity order.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support adaptive power amplifier (PA) order modeling based on instantaneous signal-to-noise ratio (SNR) and receive (Rx) diversity order. The described techniques provide for a user equipment (UE) to perform a digital post distortion correction (DPOD) process to mitigate the effects of non-linearity distortion in a wireless communications system. For instance, the UE may implement a DPOD algorithm to perform non-linearity cancellation on a received downlink signal. The DPOD algorithm may estimate non-linearity characteristics experienced at the UE. For improved estimation of the non-linearity characteristics and, as a result, improved non-linearity cancellation at the received downlink signal, the DPOD algorithm may take into account a quantity of receive antennas in use at the UE and SNR (or thermal noise) at the UE.

A method for wireless communications by a user equipment (UE) is described. The method may include transmitting, to a network entity, first information indicating a capability for adaptive power amplifier (PA) order modeling based on instantaneous signal to noise ratio (SNR), receiving, based on the first information, second information indicating a set of recommended kernel set size associations, where the set of recommended kernel set size associations include one or more associations between a quantity of receive antennas, a signal-to-noise ratio (SNR) threshold, and a kernel set size, selecting, from the set of recommended kernel set size associations and based on an instantaneous SNR measurement at the UE satisfying a first SNR threshold indicated in the set of recommended kernel set size associations, a first kernel set size associated with the first SNR threshold, and performing, based on the first kernel set size, a digital post distortion (DPoD) process on a downlink signal received from the network entity.

A UE for wireless communications is described. The UE may include one or more memories storing processor executable code, and one or more processors coupled with the one or more memories. The one or more processors may individually or collectively be operable to execute the code to cause the UE to transmit, to a network entity, first information indicating a capability for adaptive power amplifier (PA) order modeling based on instantaneous signal to noise ratio (SNR), receive, based on the first information, second information indicating a set of recommended kernel set size associations, where the set of recommended kernel set size associations include one or more associations between a quantity of receive antennas, a SNR threshold, and a kernel set size, select, from the set of recommended kernel set size associations and based on an instantaneous SNR measurement at the UE satisfying a first SNR threshold indicated in the set of recommended kernel set size associations, a first kernel set size associated with the first SNR threshold, and perform, based on the first kernel set size, a digital post distortion (DPOD) process on a downlink signal received from the network entity.

Another UE for wireless communications is described. The UE may include means for transmitting, to a network entity, first information indicating a capability for adaptive power amplifier (PA) order modeling based on instantaneous signal to noise ratio (SNR), means for receiving, based on the first information, second information indicating a set of recommended kernel set size associations, where the set of recommended kernel set size associations include one or more associations between a quantity of receive antennas, a SNR threshold, and a kernel set size, means for selecting, from the set of recommended kernel set size associations and based on an instantaneous SNR measurement at the UE satisfying a first SNR threshold indicated in the set of recommended kernel set size associations, a first kernel set size associated with the first SNR threshold, and means for performing, based on the first kernel set size, a digital post distortion (DPOD) process on a downlink signal received from the network entity.

A non-transitory computer-readable medium storing code for wireless communications is described. The code may include instructions executable by one or more processors to transmit, to a network entity, first information indicating a capability for adaptive power amplifier (PA) order modeling based on instantaneous signal to noise ratio (SNR), receive, based on the first information, second information indicating a set of recommended kernel set size associations, where the set of recommended kernel set size associations include one or more associations between a quantity of receive antennas, a SNR threshold, and a kernel set size, select, from the set of recommended kernel set size associations and based on an instantaneous SNR measurement at the UE satisfying a first SNR threshold indicated in the set of recommended kernel set size associations, a first kernel set size associated with the first SNR threshold, and perform, based on the first kernel set size, a digital post distortion (DPOD) process on a downlink signal received from the network entity.

In some examples of the method, user equipment (UEs), and non-transitory computer-readable medium described herein, the first kernel set size may be selected from the set of recommended kernel set size associations based on a quantity of active receive antennas at the UE.

Some examples of the method, user equipment (UEs), and non-transitory computer-readable medium described herein may further include operations, features, means, or instructions for transmitting, to the network entity, an indication of a quantity of active receive antennas at the UE, where receiving the second information indicating the set of recommended kernel set size associations may be further based on the quantity of active receive antennas at the UE, and where each association in the set of recommended kernel set size associations received from the network entity includes an association between the quantity of active receive antennas for the UE, a signal noise ratio threshold, and a kernel set size.

Some examples of the method, user equipment (UEs), and non-transitory computer-readable medium described herein may further include operations, features, means, or instructions for transmitting, based on detecting a change in the quantity of active receive antennas, an updated indication of an updated quantity of active receive antennas, receiving, based on the updated indication, updated second information indicating an updated set of recommended kernel set size associations, and performing, based on a second kernel set size selected from the updated set of recommended kernel set size associations and on a second instantaneous SNR measurement at the UE, the digital post distortion (DPoD) process on a second downlink signal received from the network entity.

Some examples of the method, user equipment (UEs), and non-transitory computer-readable medium described herein may further include operations, features, means, or instructions for detecting the change in the quantity of active receive antennas based on detection of an interfering signal from a neighboring network entity, a determination that the UE may have switched to a battery-saving mode, or detection of a change in a detection and demodulation technique.

In some examples of the method, user equipment (UEs), and non-transitory computer-readable medium described herein, the indication of the quantity of active receive antennas may be transmitted via a physical uplink control channel (PUCCH) message.

In some examples of the method, user equipment (UEs), and non-transitory computer-readable medium described herein, the first information may be transmitted via a medium access control-control element (MAC-CE).

In some examples of the method, user equipment (UEs), and non-transitory computer-readable medium described herein, the second information may be received via a medium access control-control element (MAC-CE).

In some examples of the method, user equipment (UEs), and non-transitory computer-readable medium described herein, the second information includes a lookup table that includes the set of recommended kernel set size associations.

A method for wireless communications by a network entity is described. The method may include receiving, from a UE, first information indicating a capability for adaptive power amplifier (PA) order modeling based on instantaneous signal to noise ratio (SNR) and transmitting, to the UE and based on the first information, second information indicating a set of recommended kernel set size associations, where the set of recommended kernel set size associations include one or more associations between a quantity of receive antennas, a SNR threshold, and a kernel set size.

A network entity for wireless communications is described. The network entity may include one or more memories storing processor executable code, and one or more processors coupled with the one or more memories. The one or more processors may individually or collectively be operable to execute the code to cause the network entity to receive, from a UE, first information indicating a capability for adaptive power amplifier (PA) order modeling based on instantaneous signal to noise ratio (SNR) and transmit, to the UE and based on the first information, second information indicating a set of recommended kernel set size associations, where the set of recommended kernel set size associations include one or more associations between a quantity of receive antennas, a SNR threshold, and a kernel set size.

Another network entity for wireless communications is described. The network entity may include means for receiving, from a UE, first information indicating a capability for adaptive power amplifier (PA) order modeling based on instantaneous signal to noise ratio (SNR) and means for transmitting, to the UE and based on the first information, second information indicating a set of recommended kernel set size associations, where the set of recommended kernel set size associations include one or more associations between a quantity of receive antennas, a SNR threshold, and a kernel set size.

A non-transitory computer-readable medium storing code for wireless communications is described. The code may include instructions executable by one or more processors to receive, from a UE, first information indicating a capability for adaptive power amplifier (PA) order modeling based on instantaneous signal to noise ratio (SNR) and transmit, to the UE and based on the first information, second information indicating a set of recommended kernel set size associations, where the set of recommended kernel set size associations include one or more associations between a quantity of receive antennas, a SNR threshold, and a kernel set size.

Some examples of the method, network entities, and non-transitory computer-readable medium described herein may further include operations, features, means, or instructions for configuring the set of recommended kernel set size associations based on an error vector magnitude (EVM) value of a PA transfer function estimation for a set of multiple different SNR values and a set of multiple different quantities of receive antennas.

Some examples of the method, network entities, and non-transitory computer-readable medium described herein may further include operations, features, means, or instructions for receiving, from the UE, an indication of a quantity of active receive antennas at the UE and where each association in the set of recommended kernel set size associations transmitted to the UE includes an association between the quantity of active receive antennas for the UE, a signal noise ratio threshold, and a kernel set size.

In some examples of the method, network entities, and non-transitory computer-readable medium described herein, the indication of the quantity of active receive antennas may be received via a PUCCH message.

In some examples of the method, network entities, and non-transitory computer-readable medium described herein, the first information may be received via a medium access control-control element (MAC-CE).

In some examples of the method, network entities, and non-transitory computer-readable medium described herein, the second information may be transmitted via a medium access control-control element (MAC-CE).

In some examples of the method, network entities, and non-transitory computer-readable medium described herein, the second information includes a lookup table that includes the set of recommended kernel set size associations.

BRIEF DESCRIPTION OF THE DRAWINGS

FIGS. 13 through 16 show flowcharts illustrating methods that support adaptive PA order modeling based on instantaneous SNR and Rx diversity order in accordance with one or more aspects of the present disclosure.

DETAILED DESCRIPTION

Various aspects of the present disclosure relate to techniques for adaptive power amplifier (PA) order modeling based on instantaneous signal-to-noise ratio (SNR) and receive (Rx) diversity order. In some implementations, one or more components (such as at a PA) of a user equipment (UE) may experience non-linear behavior (such as operating outside of a linearity region), which may negatively impact the quality of communications. To mitigate such non-linear behavior, in some cases, the UE may perform a digital post distortion correction (DPOD) process on a downlink signal received from a network entity, such as from a base station.

For example, in some wireless communications systems, reducing power consumption at both the UE and a network entity is particularly important, such as when the wireless communications system operates in super high frequency bands (e.g., sub-THz frequency bands). In some implementations, to achieve overall reduced power consumption goals in such wireless communication systems, a UE's PAs may be designed to operate with reduced supply voltage. However, reducing the supply voltage may, in some instances, cause the PA to operate outside of its linear range (such as negatively impacting the linearity region) introducing non-linear distortion at the PA. Such non-linearities may cause non-linear distortion at a transmitted signal, such as an uplink signal. A distorted signal transmitted by the UE may impact a downlink signal received at the UE by introducing interference, reducing the SNR, or causing a degradation to a quality of the downlink signal. To mitigate the impact of the non-linear distortion, the UE may perform a DPOD process on a received downlink signal. In some cases, a DPOD algorithm may be utilized to perform non-linearity cancellation on the received downlink signal. The DPOD algorithm may estimate non-linearity characteristics associated with the PA. In some implementations, the DPOD algorithm may be optimized by taking into account a quantity of active receive antennas at the UE and an instantaneous SNR (or thermal noise) measured at the UE. Optimizing the DPOD algorithm may improve estimation of the non-linearity characteristics, thereby resulting in improved non-linearity cancellation at the received downlink signal.

Aspects of the disclosure are initially described in the context of wireless communications systems. Aspects of the disclosure are further illustrated by and described with reference to apparatus diagrams, system diagrams, and flowcharts that relate to adaptive PA order modeling based on instantaneous SNR and Rx diversity order.

Figure 1:
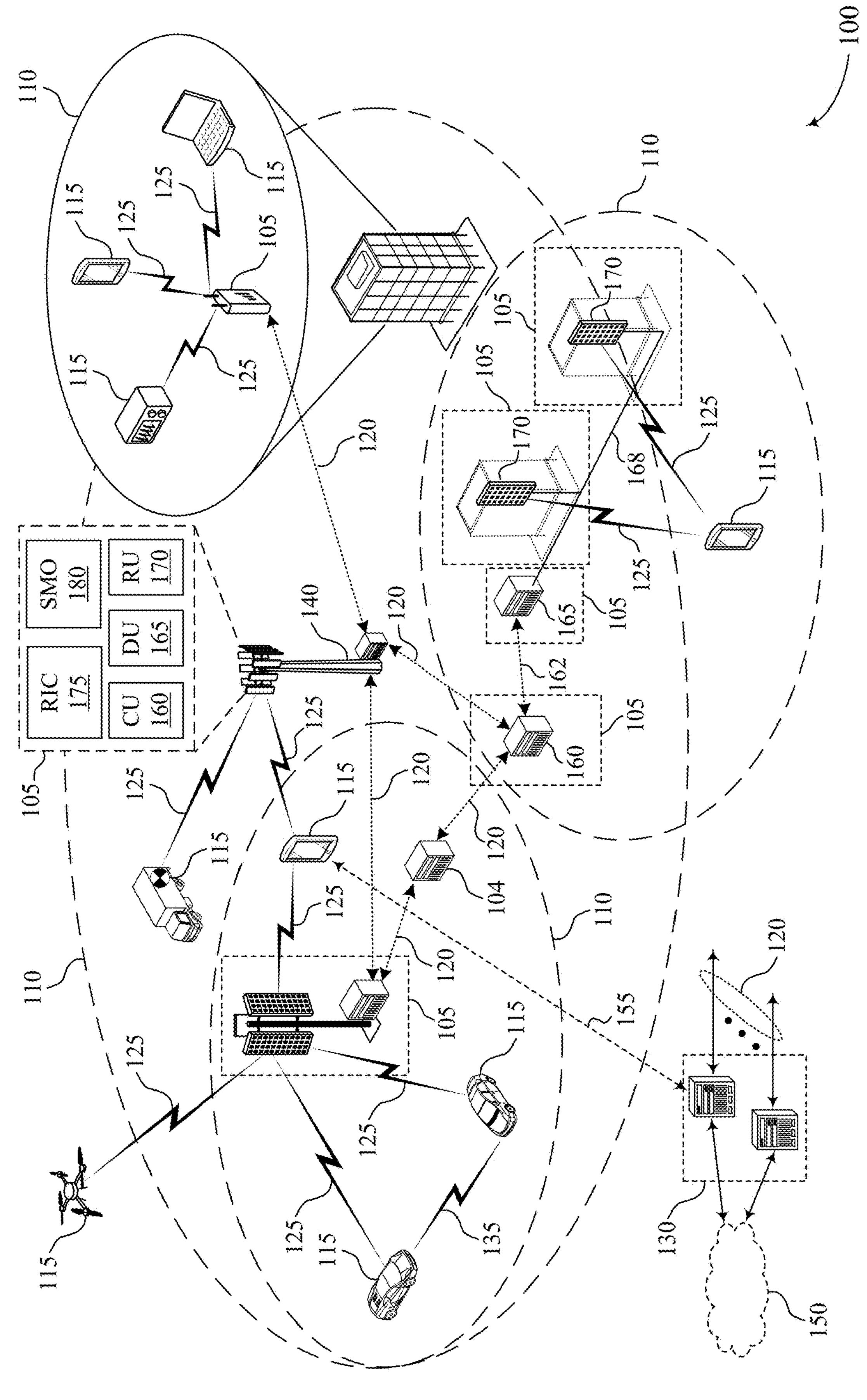
FIG. 1 shows an example of a wireless communications system that supports adaptive power amplifier (PA) order modeling based on instantaneous signal-to-noise ratio (SNR) and receive (Rx) diversity order in accordance with one or more aspects of the present disclosure.

FIG. 1 shows an example of a wireless communications system 100 that supports adaptive PA order modeling based on instantaneous SNR and Rx diversity order in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s$=1/

($\Delta f_{max} \cdot N_f$) seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some implementations, one or more components of the wireless communications system 100, such as a PA of the UE 115, may experience non-linear behavior. For instance, in some cases, the PA may operate outside of a linearity region when there is a reduction of supply voltage at the PA. The reduction of supply voltage, while helpful in reducing overall power consumption at the UE 115, may as a consequence, introduce non-linear distortion at the UE 115. Such non-linear distortion may negatively impact the quality of communications (e.g., uplink and downlink transmissions) between the UE 115 and a network entity 105 (e.g., a base station). To mitigate the non-linear distortion, in some cases, the UE 115 may perform a DPOD process on a downlink signal received from the network entity 105. In some cases, to improve the DPOD process, a DPOD algorithm used to estimate non-linearity characteristics at the UE during the DPOD process may take into account a quantity of active receive antennas at the UE 115 and an SNR at the UE 115.

Figure 2:
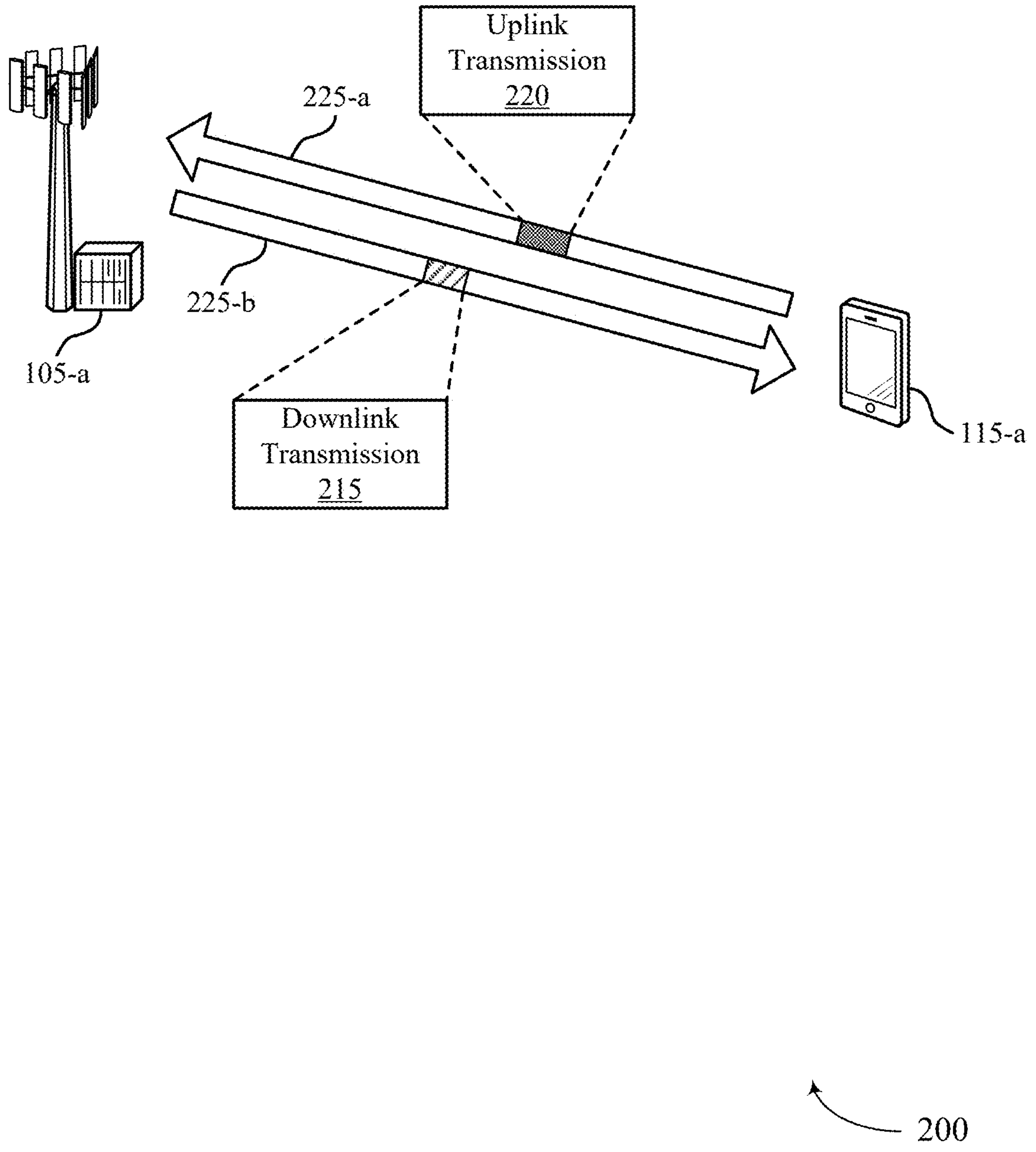
FIG. 2 shows an example of a portion of a wireless communications system that supports adaptive PA order modeling based on instantaneous SNR and Rx diversity order in accordance with one or more aspects of the present disclosure.

FIG. 2 shows an example of a portion of a wireless communications system 200 that supports adaptive PA order modeling based on instantaneous SNR and Rx diversity order in accordance with one or more aspects of the present disclosure.

The wireless communications system 200 may include a network entity 105-*a* and a UE 115-*a*, which may be examples of network entities 105 and UEs 115, respectively, as described with reference to FIG. 1. The network entity 105-*a* and UE 115-*a* may communicate using communication links (e.g., a Uu link) over which the UE 115-*a* may transmit uplink communications, such as uplink transmission 220, to the network entity 105-*a*, via an uplink channel 225-*a*; and which the network entity 105-*a* may transmit downlink communications, such as downlink transmission 215, to the UE 115-*a*, via a downlink channel 225-*b*. In some cases, one or more components of the UE 115-*a*, such as a PA of the UE 115-*a*, may experience non-linearity behavior causing non-linear distortion at the UE 115-*a*. The non-linear distortion may impact a quality of communication between the network entity 105-*a* and the UE 115-*a*. To mitigate the impact of the non-linear distortion at the UE 115-*a*, the UE 115-*a* may perform a DPOD process on a downlink signal received at the UE 115-*a* to cancel non-linear distortion.

In some implementations, the DPOD process may involve multiple stages. For instance, during an initial stage, the DPOD process may be performed to estimate the non-linear distortion (e.g., impairment) experienced at the UE 115-*a*, and during a subsequent stage, the DPOD may use or apply the estimated non-linear distortion to a downlink signal received at the UE 115-*a* to mitigate or cancel the non-linear distortion.

Accordingly, during the initial stage, the DPOD process may be performed on a DMRS received at the UE 115-*a*. At this initial stage, a PA coefficient model may be estimated to determine non-linearity. The non-linearity may be estimated jointly and iteratively with channel estimation. Accordingly, the PA coefficient estimation may be performed over DMRS pilots to determine an estimated non-linear distortion (e.g., impairment). For instance, the UE 115-*a* may utilize the DMRS pilots to estimate the channel and the noise. In some cases, due to the non-linearity impairment of the observed signal, the initial channel estimation might be relatively inaccurate.

The non-linearity impairment may be represented as an infinite odd polynomial expression referred to as a PA coefficient estimation model:

$$NL(x(t)) = \sum_{n=0}^{\infty} c_n x|x|^{2(n+1)}$$

The PA coefficient estimation model assumes no memory terms, however, in the case that there are memory components, the expression, in some cases, may consist of the following components:

$$x[n]\cdot|x[n-d_1]|2,\ x[n]\cdot x[n-d_2]*conj(x[n-d2]),\ x[n]\cdot|x[n-d3]|2$$

where $d_i$ is the time delay of the components.

The PA coefficient estimation model may utilize a DPOD algorithm. The DPOD algorithm may estimate non-linearity characteristics in each transmission (Tx) antenna as a finite degree polynomial. For example, the non-linearity characteristics may be approximated by:

$$NL_t(x) \approx \sum_{n=0}^{K} c_{t,n} x|x|^{2(n+1)}$$

where t is the Tx antenna index and K is the size of the kernel set.

Thus, estimating the non-linearity coefficients $$\{c_{t,n}\}_{n=0}^{K}$$

for each Tx antenna t yields an estimation of the corresponding non-linearity distortion. In this example, the estimation and the correction of the non-linearity distortion may be for a single-input single-output (SISO) communication system, and K=2, (e.g., the parameters' set is $$\{c_n\}_{n=0}^{2} = \{c_0, c_1, c_2\}).$$

However, the PA coefficient estimation model may be utilized for a MIMO system, for K>2, or for an estimation which also consists of memory components.

The observed signal y (t), with the non-linearity impairment, may be approximated by the following polynomial model:

$$y(t) = h(t)*(x(t)+NL(x(t)) = h(t)*x(t) + h(t)*\sum_{n=0}^{K} c_n x|x|^{2(n+1)} + \text{noise}(t)$$

where * is the convolution operator, h(t), x(t), and NL(x(t)) are the time domain (TD) representations of the channel, the transmitted signal, and the non-linearity distortion, respectively.

For K=2:

$$y(t) = h(t)*\left[x(t) + c_1 x(t)|x(t)|^2 + c_2 x(t)|x(t)|^4 + c_3 x(t)|x(t)|^6\right] + \text{noise}(t)$$

where $\hat{h}(t)$ is the channel estimation.

The network entity 105-*a* may apply the channel estimation on the DMRS pilots to generate $\hat{h}(t)*x(t)$. For instance, the network entity 105-*a* may apply the channel estimation on the DMRS pilots and may perform the PA coefficient estimation to find the PA model coefficients for the UE 115-*a*, by comparing the observed signal with the generated signal.

After performing the PA coefficient estimation, the non-linear distortion may be subtracted (e.g., canceled) from the observed signal. For instance, $\hat{h}(t)*x(t)$ may be subtracted from the observed y(t) to generate ξ(t)—the observed non-linearity impairment after the channel influence:

$$\xi(t) = y(t) - \hat{h}(t)*x(t)$$

For the previous presented equation, it may be concluded that:

$$\underbrace{y(t)-\hat{h}(t)*x(t)}_{\xi(t)}=$$

$$c_0\underbrace{\hat{h}(t)*x(t)|x(t)|^2}_{\psi_0(t)}+c_1\underbrace{\hat{h}(t)*x(t)|x(t)|^4}_{\psi_1(t)}+c_2\underbrace{\hat{h}(t)*x|x|^6}_{\psi_2(t)}+\text{noise}(t)$$

where $$\{\psi_i(t)\}_{i=0}^{2}$$

is the PA's estimated polynomial components after the channel influence. For instance, assuming that x(t) consists of N samples:

$$\begin{bmatrix}\xi(0)\\ \xi(1)\\ \vdots\\ \xi(N-1)\end{bmatrix}=\underbrace{\begin{bmatrix}\psi_0(0) & \psi_1(0) & \psi_2(0)\\ \psi_0(1) & \psi_1(1) & \psi_2(1)\\ \vdots & \vdots & \vdots\\ \psi_0(N-1) & \psi_1(N-1) & \psi_2(N-1)\end{bmatrix}}_{M}\underbrace{\begin{bmatrix}c_0\\ c_1\\ c_2\end{bmatrix}}_{\theta}+\begin{bmatrix}\text{noise}(0)\\ \text{noise}(1)\\ \vdots\\ \text{noise}(N-1)\end{bmatrix}$$

Thus, the least squares estimation may be expressed as:

$$\hat{\theta}=[\hat{c}_0,\hat{c}_1,\hat{c}_2]=(M^HM)^{-1}M^H\cdot\xi(t)$$

After estimating the coefficient, the estimated non-linearity estimation may be expressed as:

$$\widehat{NL}(x(t))=\sum_{n=0}^{2}\hat{c}_nx(t)|x(t)|^{2(n+1)}$$

The estimation may be expressed as:

$$y_{corrected}(t)=y(t)-\hat{h}(t)*\widehat{NL}(x(t))$$

In some cases, the channel and non-linearity model estimation process at the DMRS may iterate until a threshold error level on the DMRS pilots is satisfied.

After performing the DPOD process on the DMRS, in a subsequent stage, the DPOD process may be performed on a downlink signal, such as a PDSCH. During this stage, data received in a downlink signal may be corrected by subtracting (e.g., canceling) the estimated non-linear distortion from the data signal. The non-linear distortion may be reconstructed by applying the PA coefficient model on the received equalized (e.g., corrected) data.

Accordingly, the DPOD algorithm may estimate non-linearity characteristics at the UE 115-*a* as a finite degree polynomial. For example, the non-linearity characteristics may be approximated by an Nth order polynomial which may be comprised of kernels:

$$f(x)=\sum_{n=0}^{N}c_nx|x|^{2n}+O(2N+1)$$

In some cases, the more kernels the DPOD algorithm uses, the more accurate the non-linearity cancellation may be, resulting in improved performance at the UE 115-*a*. However, a quality of the estimation of the non-linearity characteristics may depend on both a thermal noise (e.g., the SNR) experienced at the UE 115-*a* and on a quantity of available signals. In some cases, low SNR may lead to a higher estimation error, while more signals may lead to a lower estimation error. The quantity of available signals may be based on a quantity of active receive antennas at the UE 115-*a*. Further, in some implementation, different PAs (such as PAs at the network entity 105-*a*) may require a different quantity of kernels (e.g., different kernel set sizes) to achieve a threshold level of estimation accuracy for a given quantity of active receive antennas and a given SNR (e.g., additive white Gaussian noise (AWGN)) at the UE 115-*a*. To maximize an error vector magnitude (EVM) (such as post-DPOD correction), the network entity 105-*a* may determine, for a given PA at the network entity 105-*a*, an optimal quantity of kernels (e.g., a kernel set size) for the DPOD algorithm for a given quantity of active Rx antennas and a given SNR at the UE 115-*a*. Use of the optimal quantity of kernels for the DPOD algorithm for a given quantity of active Rx antennas and a given SNR at the UE 115-*a* may result in improved estimation of the non-linearity characteristics and, thereby, improved non-linearity cancellation at a received downlink signal.

Figure 3:
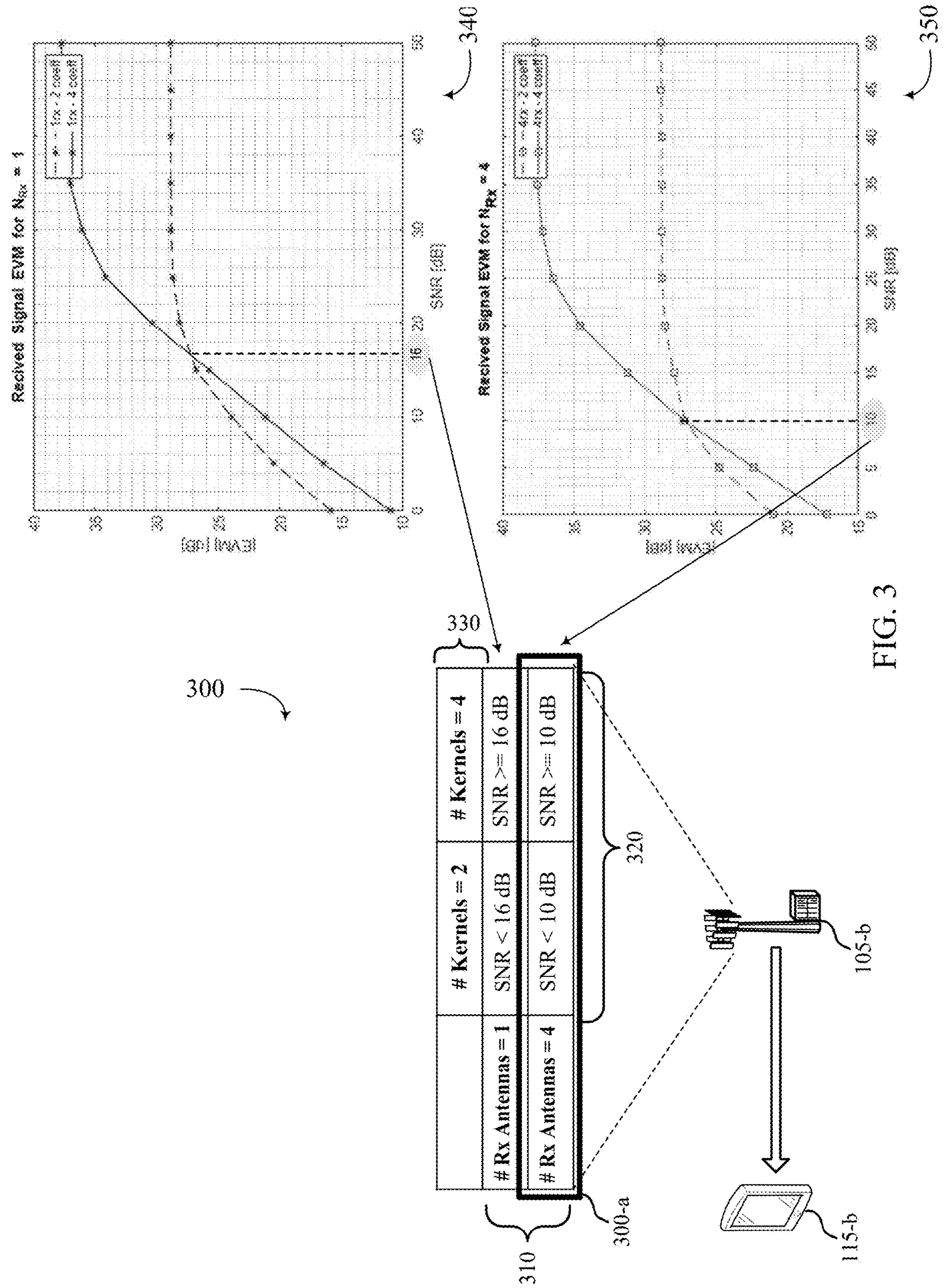
FIG. 3 shows an example of a set of recommended kernel set size associations that supports adaptive PA order modeling based on instantaneous SNR and Rx diversity order in accordance with one or more aspects of the present disclosure.

FIG. 3 shows an example of a set of recommended kernel set size associations 300 that supports adaptive PA order modeling based on instantaneous SNR and Rx diversity order in accordance with one or more aspects of the present disclosure. In some implementations, a network entity 105-*b*, which may be an example of the network entities 105 and 105-*a*, described with reference to FIGS. 1 and 2, may determine an optimal or recommended quantity of kernels (e.g., a kernel set size) to use in a DPOD algorithm for estimating a non-linearity distortion at a UE, such as the UE 115-*b*, which may be an example of UEs 115 and 115-*a*, described in reference to FIGS. 1 and 2.

For example, a PA transfer function may be approximated by a finite kernel set. The size of the kernel set may be equal to a quantity of non-linearity parameters (e.g., a quantity of non-linearity coefficients at a DPOD algorithm of the DPOD process) that may ensure an accurate estimation of non-linearity distortion at the UE 115-*b*. In some cases, the larger the kernel set size, the more accurate the estimation may be. However, in some cases a least squares estimation in low SNR scenarios may lead to less accurate estimation. Accordingly, the network entity 105-*b* may be configured to determine specific kernel set sizes that may be likely to achieve the best approximation of the PA transfer function in terms of EVM under different scenarios. For instance, the network entity 105-*b* may be configured to calculate the EVM error of the PA transfer function estimation for different SNR values. Moreover, the network entity 105-*b* may test different possible values of quantities of active UE receive antennas (NRx). In some cases, the larger the quantity of active UE receive antennas, the better the EVM results may be.

Accordingly, based on the specific kernel set sizes determined by the network entity 105-*b* as likely to achieve the best approximation of the PA transfer function, the network entity 105-*b* may identify a recommended kernel set size to use in the DPOD algorithm for estimating a non-linearity distortion at a UE, such as the UE 115-*b*. The recommended kernel set size may be based on a quantity of receive antennas in use at the UE 115-*b*, a SNR experienced at the UE 115-*b*, or a combination thereof. The network entity 105-*b* may determine different recommended kernel set sizes for different combinations of active receive antennas and SNR values. For instance, the network entity 105-*b* may generate a set of associations of recommended kernel set sizes. The set of associations may include one or more associations between a quantity of active receive antennas 310, a SNR threshold value 320, and a recommended kernel set size 330. That is, the set of recommended kernel set size associations 300 may indicate, for a given quantity of active receive antennas 310 at the UE 115-*a*, a recommended kernel set size 330 based on whether an SNR at the UE 115-*b* satisfies a given SNR threshold value 320. By way of example, if the UE 115-*b* has 1 active receive antenna 310 and instantaneous SNR measured at the UE 115-*b* is less than the SNR threshold value 320 of 16 dB, then the recommended kernel set size 330 may be 2, while if the measured instantaneous SNR is greater than or equal to the SNR threshold value 320 of 16 dB, then the recommended kernel set size 330 may be 4. In this case, the network entity 105-*b* may have determined the recommended kernel set size based on estimating the performance of the PA transfer function for different SNR values when the UE has 1 active receive antenna, as shown in graph 350. Likewise, if, for example, the UE 115-*b* has 4 active receive antennas 310 and instantaneous SNR measured at the UE 115-*b* is less than the SNR threshold value 320 of 10 dB, then the recommended kernel set size 330 may be 2, while if the measured instantaneous SNR is greater than or equal to the SNR threshold value 320 of 10 dB, then the recommended kernel set size 330 may be 4. In this case, the network entity 105-*b* may have determined the recommended kernel set size based on estimating the performance of the PA transfer function for different SNR values when the UE has 4 active receive antennas, as shown in graph 340.

The network entity 105-*b* may notify or inform the UE 115-*b* of the set of recommended kernel set size associations 300, so that the UE 115-*b* may configure the DPOD algorithm to accurately estimate the non-linearity distortion at the UE 115-*b*. In some cases, the set of recommended kernel set size associations 300 may be transmitted to the UE 115-*b* based on the UE 115-*b* informing the network entity 105-*b* of a capability of the UE 115-*b* for PA order modeling based on instantaneous SNR. For instance, upon connection, the UE 115-*b* may transmit, via a medium access control-control element (MAC-CE), a capability message that indicates a capability of the UE 115-*b* for PA order modeling based on instantaneous SNR. In response, the network entity 105-*b* may transmit, to the UE 115-*b*, configuration information that includes the set of recommended kernel set size associations 300. In some cases, the network entity 105-*b* may transmit a lookup table that includes the set of recommended kernel set size associations 300. The configuration information including the set of recommended kernel set size associations 300 may be transmitted to the UE 115-*b* via MAC-CE.

In some cases, the UE 115-*b* may inform the network entity 105-*b* of a quantity of receive antennas that are active at the UE 115-*b*. For instance, the UE 115-*b* may transmit to the network entity 105-*b*, via a control message (such as over a PUCCH), an indication of a quantity of receive antennas that are active at the UE 115-*b*. The transmission of such information may be performed dynamically to support changes in the quantity of receive antennas in operation at the UE 115-*b*, such as when one or more receive antennas are turned on or off during operation. That is, the quantity of active receive antennas at the UE 115-*b* may change during operation, for various reasons, such as if the UE 115-*b* switches to a battery saving mode, which may trigger one or more of the receive antennas to be shut down, or if the UE 115-*b* experiences canceling neighbor network entity (e.g., neighbor gNB) interfering signals, which may be a trigger to turn on additional receive antennas at the UE 115-*b*, or if there is a change in a detection and demodulation technique. In some cases, changes in a quantity of active receive antennas at the UE 115-*b* may trigger the UE 115-*b* to inform the network 105-*b* of an updated quantity of active receive antennas.

In some cases, the network entity 105-*b* may inform the UE 115-*b* of the recommended kernel set sizes in response to receiving the indication of a quantity (or an updated quantity) of active receive antennas at the UE 115-*b*. For instance, when the UE 115-*b* informs (or updates) the network entity 105-*b* as to the quantity of active receive antennas, rather than transmitting the entire set of recommended kernel set size associations 300 to the UE 115-*b*, the network entity 105-*b* may instead transmit a subset of recommended kernel set size associations 300-*a* to the UE 115-*b*. The subset of recommended kernel set size associations 300-*a* may be those that are applicable to the quantity of receive antennas active at the UE 115-*b*. By way of example, if the UE 115-*b* transmits to the network entity 105-*b* an indication that there are 4 active receive antennas at the UE 115-*b*, the network entity 105-*b* may transmit to the UE 115-*b* the subset of recommended kernel set size associations 300-*a* that apply to UEs operating 4 receive antennas. The network entity 105-*b* may transmit, to the UE 115-*b* via a MAC-CE, configuration information that includes the subset of recommended kernel set size associations 300-*a*

If the UE 115-*b* receives the set of recommended kernel set size associations 300, the UE 115-*b* may determine or identify those associations that are relevant to the UE 115-*b* based on a quantity of active receive antennas at the UE 115-*b*. From those identified associations, the UE 115-*b* may then determine or identify a recommended kernel set size based on instantaneous SNR measured at the UE 115-*b*.

If the UE 115-*b* instead receives the subset of recommended kernel set size associations, the UE 115-*b* may determine or identify, from the subset, a recommended kernel set size based on instantaneous SNR measured at the UE 115-*b*.

The UE 115-*b* may use the determined or identified recommended kernel set size in the DPOD process to cancel or minimize non-linearity distortion at the UE 115-*b*. For instance, the UE 115-*b* may utilize the recommended kernel set size when performing the DPOD process on a downlink signal received from the network entity 105-*b* to mitigate or cancel non-linear distortion.

Figure 4:
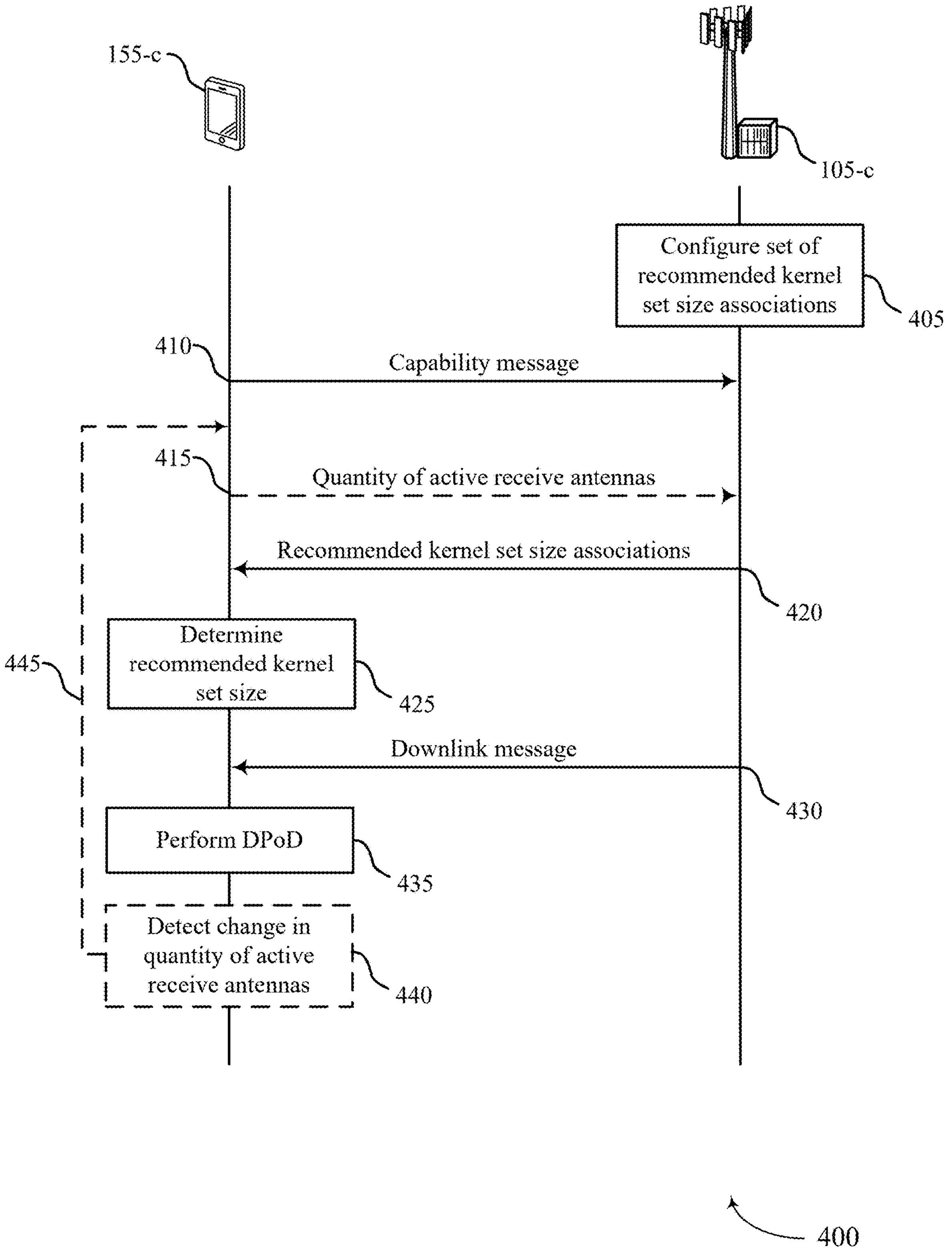
FIG. 4 shows an example of a signal flow that supports adaptive PA order modeling based on instantaneous SNR and Rx diversity order in accordance with one or more aspects of the present disclosure.

FIG. 4 shows an example of a signal flow 400 that supports adaptive PA order modeling based on instantaneous SNR and Rx diversity order in accordance with one or more aspects of the present disclosure. In some examples, signal flow 400 may implement aspects of wireless communications system 100 or 200 or the set of recommended kernel set size associations 300, as described with reference to FIGS. 1, 2, and 3, respectively. Signal flow 400 may be implemented by a UE 115-*c* and network entity 105-*c*, which may be examples of UEs 115, 115-*a*, or 115-*b* and network entities 105, 105-*a*, and 105-*b*, as described with reference to FIGS. 1, 2, and 3. In the following description of the signal flow 400, the communications between the UE 115-*c* and the network entity 105-*c* may be transmitted in a different order than the example order shown, or the operations performed by the UE 115-*c* and the network entity 105-*c* may be performed in different orders or at different times. Some operations may also be omitted from the signal flow 400, and other operations may be added to the signal flow 400.

In some examples, the operations illustrated in signal flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the network entity 105-*c* may configure a set of recommended kernel set size associations. For instance, the network entity 105-*c* may determine the set of recommended kernel set sizes by calculating an EVM error of a PA transfer function estimation for different SNRs and different quantities of receive antennas. In some cases, this configuration may occur as part of a factory calibration process.

At 410, the UE 115-*c* may transmit a capability message to the network entity 105-*c*. The capability message may indicate a capability of the UE 115-*c* for adaptive PA order modeling based on instantaneous SNR. The capability message may be transmitted at a time of connection to the network entity 105-*c* via a MAC-CE.

At 415, the UE 115-*c* may optionally transmit, to the network entity 105-*c*, an indication of a quantity of receive antennas that are active (e.g., in use or turned on) at the UE 115-*c*. The indication of the quantity of active receive antennas may be transmitted in control signaling, such as via PUCCH.

At 420, responsive to the indication that the UE 115-*c* is capable of adaptive PA order modeling based on instantaneous SNR, the network entity 105-*c* may transmit, to the UE 115-*c*, a set of recommended kernel set size associations (or, in some cases a subset of the set of recommended kernel set size associations). In some cases, such as when the UE 115-*c* transmits the indication of the quantity of active receive antennas at the UE 115-*c*, the network entity 105-*c* may instead transmit a subset of the set of recommended kernel set size associations, such as those associations that are applicable to the quantity of active receive antennas at the UE 115-*c*. The set or subset of recommended kernel set size associations may be transmitted to the UE 115-*c* via a MAC-CE.

At 425, the UE 115-*c* may determine from the set or subset of recommended kernel set size associations, a recommended kernel set based on instantaneous SNR measured at the UE 115-*c*. For instance, if the UE 115-*c* receives the set of recommended kernel set size associations, it may determine or identify those associations that are relevant to the UE 115-*c* based on a quantity of active receive antennas at the UE 115-*c*. From those identified associations, the UE 115-*b* may then determine or identify a recommended kernel set size based on instantaneous SNR measured at the UE 115-*c*. If the UE 115-*c* instead receives the subset of recommended kernel set size associations, the UE 115-*c* may determine or identify, from the subset, a recommended kernel set size based on instantaneous SNR measured at the UE 115-*b*.

At 430, the UE 115-*c* may receive a downlink message from the network entity 105-*c*. For instance, the UE 115-*c* may receive signaling including a PDSCH transmission from the network entity 105-*c*.

At 435, the UE 115-*c* may perform a DPOD process on the downlink message using the determined recommended kernel set size. For instance, the UE 115-*c* may use the determined recommended kernel set size in the DPOD process (e.g., at a DPOD algorithm) to cancel or mitigate non-linearity distortion at the downlink signal including the downlink message.

At 440, the UE 115-*c* may detect a change in a quantity of active receive antennas at the UE 115-*c*. For example, in some cases, one or more receive antennas may be turned off or on during operation of the UE 115-*c* causing one or more antennas to change their active or inactive state. By way of non-limiting examples, the UE 115-*c* may detect a change in a quantity of active receive antennas when the UE 115-*c* switches to a battery saving mode, when the UE 115-*b* experiences canceling neighbor network entity (e.g., neighbor gNB) interfering signals, when there is a change in a detection and demodulation technique.

At 445, responsive to detecting the change in the quantity of active receive antennas at the UE 115-*c*, or in some cases responsive to detecting a triggering event that results in the change in the quantity of active receive antennas at the UE 115-*c*, the UE 115-*c* may transmit, to the network entity 105-*c*, an indication of an updated quantity of active receive antennas at the UE 115-*c*. In such cases, steps 420 through 440 may be repeated responsive to the updated quantity of active receive antennas. For instance, the network entity 105-*c* may transmit, to the UE 115-*c*, an updated subset of recommended kernel set size associations that is based on the updated quantity of receive antennas. Alternatively, the network entity 105-*c* may transmit to the UE 115-*c* an updated full set of recommended kernel set size associations that may include associations that include the updated quantity of receive antennas. Thereafter, the UE 115-*c* may determine an updated recommended kernel set size based on the updated set or subset of recommended kernel set size associations and use the updated recommended kernel set size to perform a DPOD process on a subsequent downlink message received at the UE 115-*c*.

Figure 5:
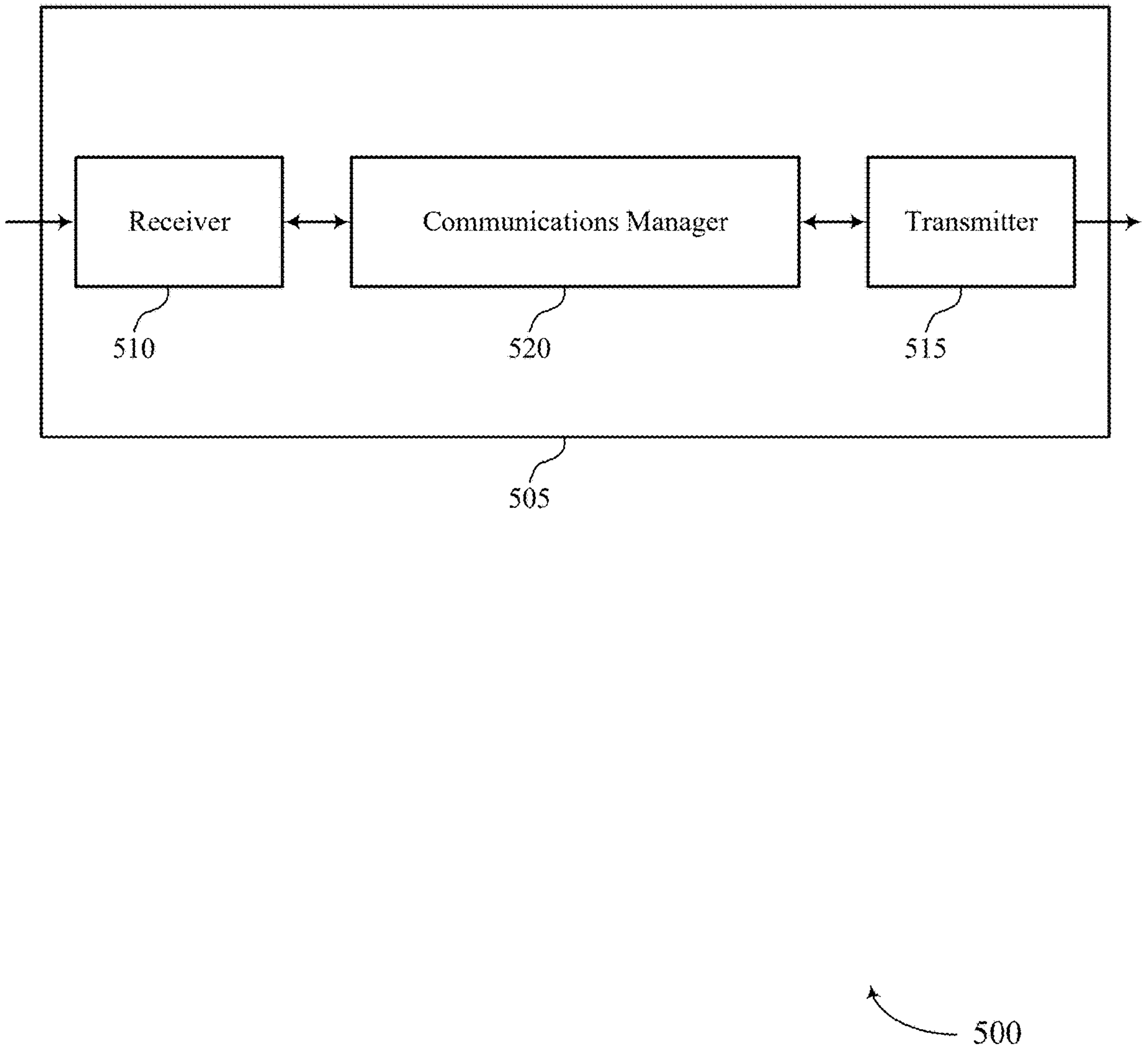
FIGS. 5 and 6 show block diagrams of devices that support adaptive PA order modeling based on instantaneous SNR and Rx diversity order in accordance with one or more aspects of the present disclosure.

FIG. 5 shows a block diagram 500 of a device 505 that supports adaptive PA order modeling based on instantaneous SNR and Rx diversity order in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to adaptive PA order modeling based on instantaneous SNR and Rx diversity order). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to adaptive PA order modeling based on instantaneous SNR and Rx diversity order). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of adaptive PA order modeling based on instantaneous SNR and Rx diversity order as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for transmitting, to a network entity, first information indicating a capability for adaptive PA order modeling based on instantaneous SNR. The communications manager 520 is capable of, configured to, or operable to support a means for receiving, based on the first information, second information indicating a set of recommended kernel set size associations, where the set of recommended kernel set size associations include one or more associations between a quantity of receive antennas, a SNR threshold, and a kernel set size. The communications manager 520 is capable of, configured to, or operable to support a means for selecting, from the set of recommended kernel set size associations and based on an instantaneous SNR measurement at the UE satisfying a first SNR threshold indicated in the set of recommended kernel set size associations, a first kernel set size associated with the first SNR threshold. The communications manager 520 is capable of, configured to, or operable to support a means for performing, based on the first kernel set size, a DPOD process on a downlink signal received from the network entity.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced power consumption and improved throughput and communication reliability.

Figure 6:
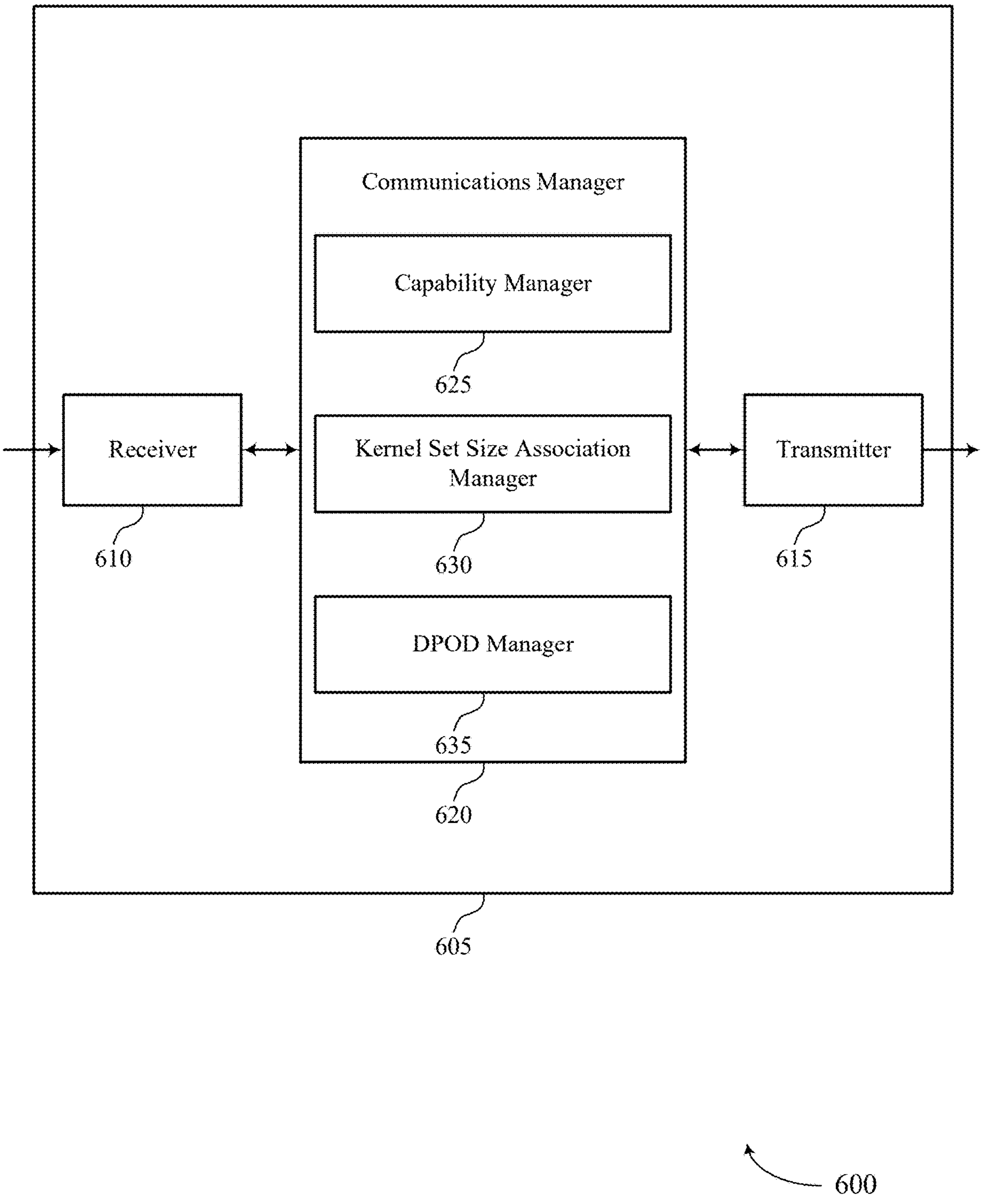

FIG. 6 shows a block diagram 600 of a device 605 that supports adaptive PA order modeling based on instantaneous SNR and Rx diversity order in accordance with one or more aspects of the present disclosure. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to adaptive PA order modeling based on instantaneous SNR and Rx diversity order). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to adaptive PA order modeling based on instantaneous SNR and Rx diversity order). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of adaptive PA order modeling based on instantaneous SNR and Rx diversity order as described herein. For example, the communications manager 620 may include a capability manager 625, a kernel set size association manager 630, a DPOD manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The capability manager 625 is capable of, configured to, or operable to support a means for transmitting, to a network entity, first information indicating a capability for adaptive PA order modeling based on instantaneous SNR. The kernel set size association manager 630 is capable of, configured to, or operable to support a means for receiving, based on the first information, second information indicating a set of recommended kernel set size associations, where the set of recommended kernel set size associations include one or more associations between a quantity of receive antennas, a SNR threshold, and a kernel set size. The kernel set size association manager 630 is capable of, configured to, or operable to support a means for selecting, from the set of recommended kernel set size associations and based on an instantaneous SNR measurement at the UE satisfying a first SNR threshold indicated in the set of recommended kernel set size associations, a first kernel set size associated with the first SNR threshold. The DPOD manager 635 is capable of, configured to, or operable to support a means for performing, based on the first kernel set size, a DPOD process on a downlink signal received from the network entity.

Figure 7:
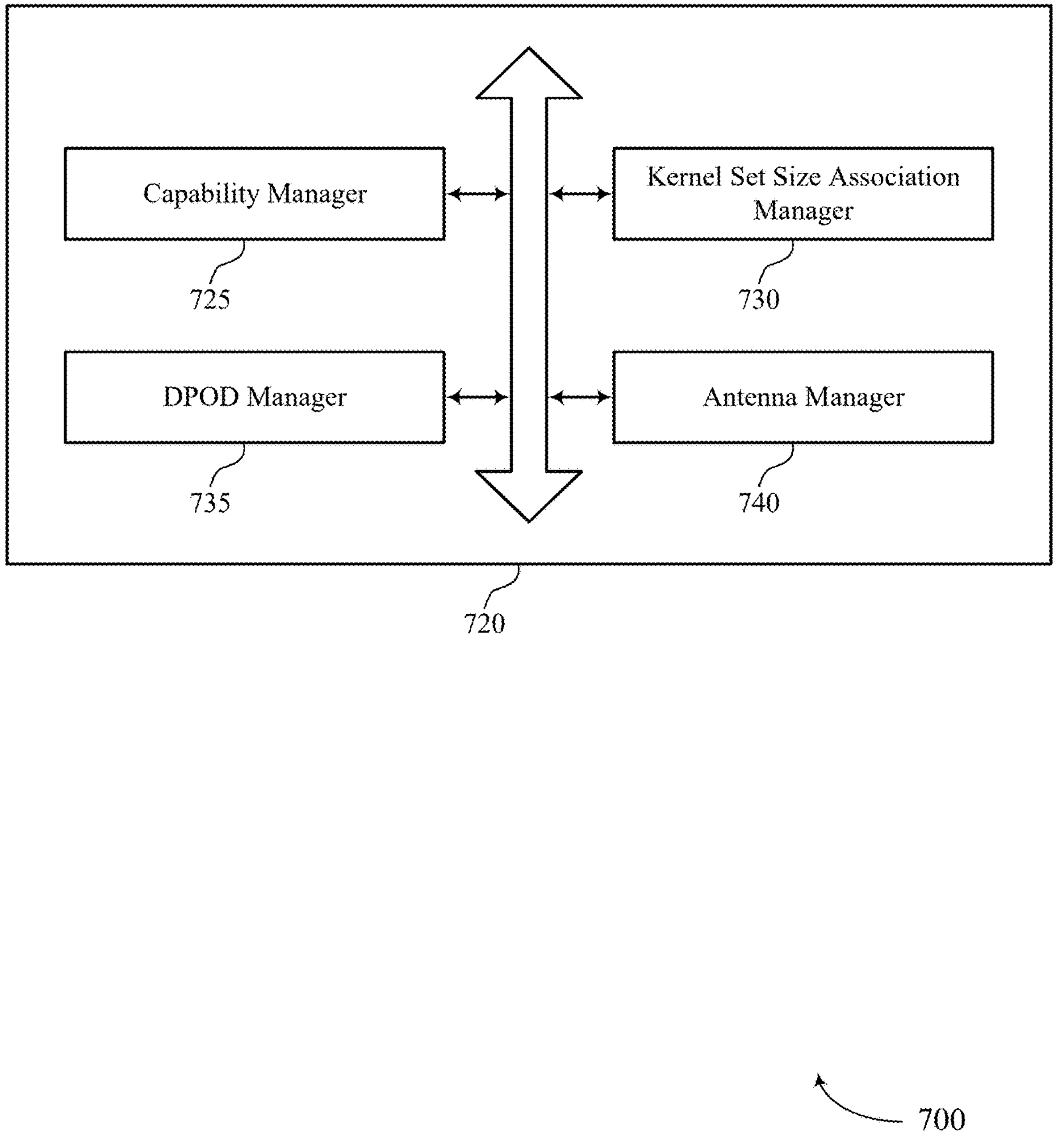
FIG. 7 shows a block diagram of a communications manager that supports adaptive PA order modeling based on instantaneous SNR and Rx diversity order in accordance with one or more aspects of the present disclosure.

FIG. 7 shows a block diagram 700 of a communications manager 720 that supports adaptive PA order modeling based on instantaneous SNR and Rx diversity order in accordance with one or more aspects of the present disclosure. The communications manager 720 may be an example of aspects of a communications manager 520, a communications manager 620, or both, as described herein. The communications manager 720, or various components thereof, may be an example of means for performing various aspects of adaptive PA order modeling based on instantaneous SNR and Rx diversity order as described herein. For example, the communications manager 720 may include a capability manager 725, a kernel set size association manager 730, a DPOD manager 735, an antenna manager 740, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The capability manager 725 is capable of, configured to, or operable to support a means for transmitting, to a network entity, first information indicating a capability for adaptive PA order modeling based on instantaneous SNR. The kernel set size association manager 730 is capable of, configured to, or operable to support a means for receiving, based on the first information, second information indicating a set of recommended kernel set size associations, where the set of recommended kernel set size associations include one or more associations between a quantity of receive antennas, a SNR threshold, and a kernel set size. In some examples, the kernel set size association manager 730 is capable of, configured to, or operable to support a means for selecting, from the set of recommended kernel set size associations and based on an instantaneous SNR measurement at the UE satisfying a first SNR threshold indicated in the set of recommended kernel set size associations, a first kernel set size associated with the first SNR threshold. The DPOD manager 735 is capable of, configured to, or operable to support a means for performing, based on the first kernel set size, a DPOD process on a downlink signal received from the network entity.

In some examples, the first kernel set size is selected from the set of recommended kernel set size associations based on a quantity of active receive antennas at the UE.

In some examples, the antenna manager 740 is capable of, configured to, or operable to support a means for transmitting, to the network entity, an indication of a quantity of active receive antennas at the UE. In some examples, the kernel set size association manager 730 is capable of, configured to, or operable to support a means for receiving the second information indicating the set of recommended kernel set size associations further based on the quantity of active receive antennas at the UE.

In some examples, each association in the set of recommended kernel set size associations received from the network entity includes an association between the quantity of active receive antennas for the UE, a signal noise ratio threshold, and a kernel set size.

In some examples, the antenna manager 740 is capable of, configured to, or operable to support a means for transmitting, based on detecting a change in the quantity of active receive antennas, an updated indication of an updated quantity of active receive antennas. In some examples, the kernel set size association manager 730 is capable of, configured to, or operable to support a means for receiving, based on the updated indication, updated second information indicating an updated set of recommended kernel set size associations. In some examples, the DPOD manager 735 is capable of, configured to, or operable to support a means for performing, based on a second kernel set size selected from the updated set of recommended kernel set size associations and on a second instantaneous SNR measurement at the UE, the DPOD process on a second downlink signal received from the network entity.

In some examples, the antenna manager 740 is capable of, configured to, or operable to support a means for detecting the change in the quantity of active receive antennas based on detecting an interfering signal from a neighboring network entity.

In some examples, the antenna manager 740 is capable of, configured to, or operable to support a means for detecting the change in the quantity of active receive antennas based at least in part detecting that the UE has switched to a battery-saving mode.

In some examples, the antenna manager 740 is capable of, configured to, or operable to support a means for detecting the change in the quantity of active receive antennas based on detecting a change in a detection and demodulation technique.

In some examples, transmitting the indication of the quantity of active receive antennas includes transmitting the indication of the quantity of active receive antennas via a PUCCH message.

In some examples, transmitting the first information indicating the capability for adaptive PA order modeling includes transmitting the first information via a MAC-CE.

In some examples, receiving the second information indicating the set of recommended kernel set size associations includes receiving the second information via a MAC-CE.

In some examples, the second information includes a lookup table that includes the set of recommended kernel set size associations.

Figure 8:
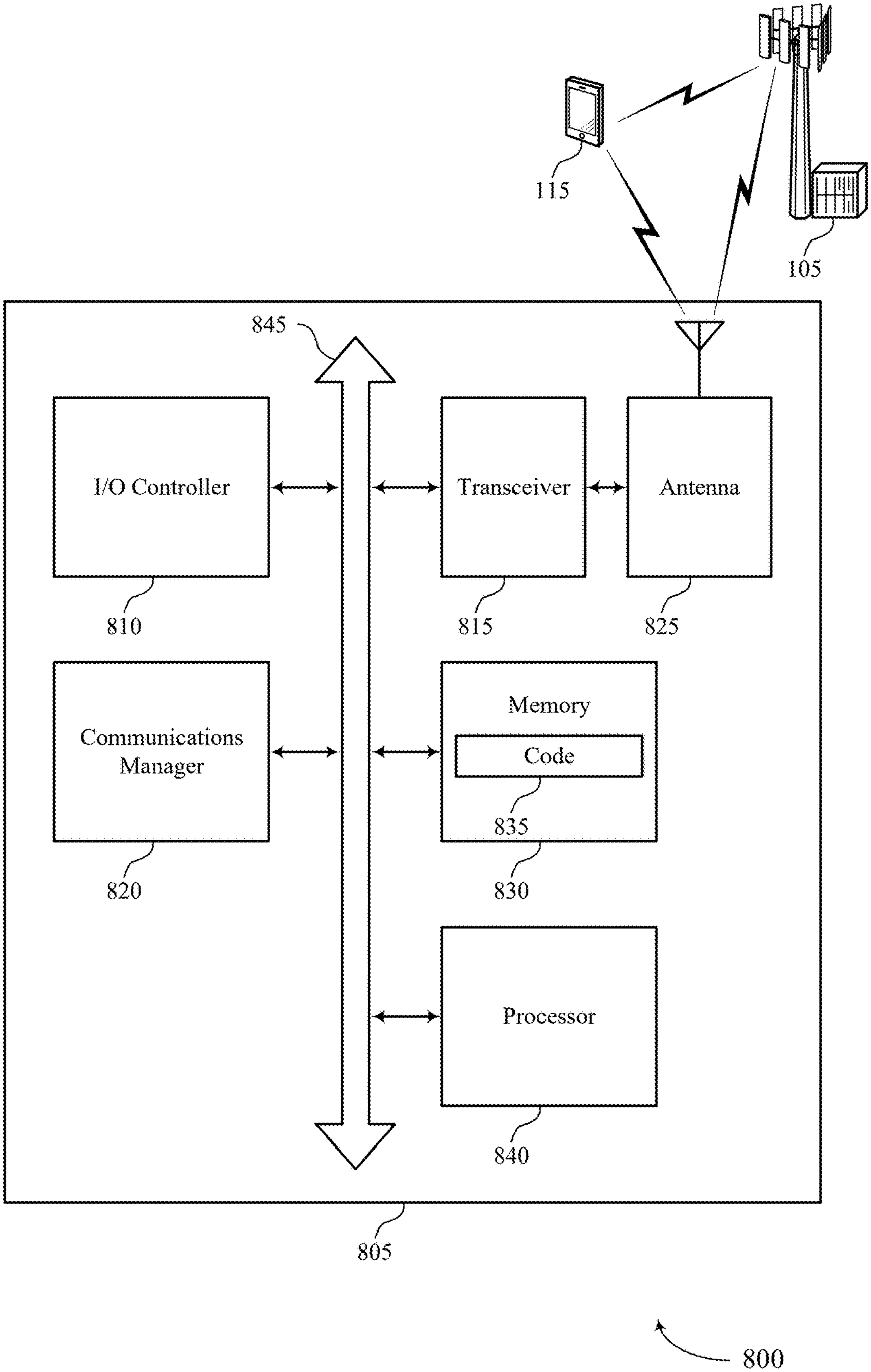
FIG. 8 shows a diagram of a system including a device that supports adaptive PA order modeling based on instantaneous SNR and Rx diversity order in accordance with one or more aspects of the present disclosure.

FIG. 8 shows a diagram of a system 800 including a device 805 that supports adaptive PA order modeling based on instantaneous SNR and Rx diversity order in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICS, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting adaptive PA order modeling based on instantaneous SNR and Rx diversity order). For example, the device 805 or a component of the device 805 may include at least one processor 840 and at least one memory 830 coupled with or to the at least one processor 840, the at least one processor 840 and the at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for transmitting, to a network entity, first information indicating a capability for adaptive PA order modeling based on instantaneous SNR. The communications manager 820 is capable of, configured to, or operable to support a means for receiving, based on the first information, second information indicating a set of recommended kernel set size associations, where the set of recommended kernel set size associations include one or more associations between a quantity of receive antennas, a SNR threshold, and a kernel set size. The communications manager 820 is capable of, configured to, or operable to support a means for selecting, from the set of recommended kernel set size associations and based on an instantaneous SNR measurement at the UE satisfying a first SNR threshold indicated in the set of recommended kernel set size associations, a first kernel set size associated with the first SNR threshold. The communications manager 820 is capable of, configured to, or operable to support a means for performing, based on the first kernel set size, a DPOD process on a downlink signal received from the network entity.

By including or configuring the communications manager 820 in accordance with examples as described herein, the device 805 may support techniques for improved communication reliability, reduced power consumption, and improved throughput.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of adaptive PA order modeling based on instantaneous SNR and Rx diversity order as described herein, or the at least one processor 840 and the at least one memory 830 may be otherwise configured to, individually or collectively, perform or support such operations.

Figure 9:
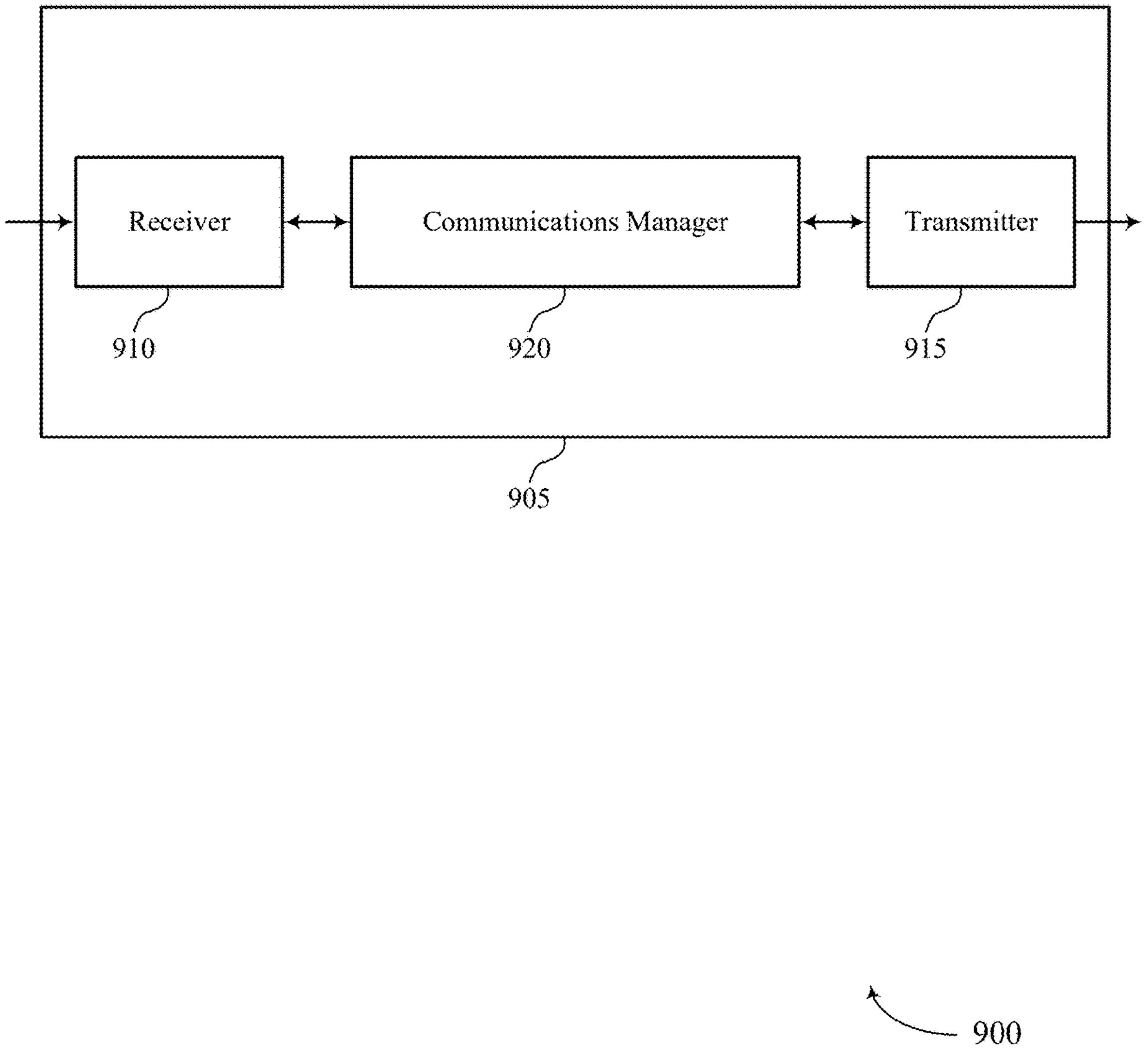
FIGS. 9 and 10 show block diagrams of devices that support adaptive PA order modeling based on instantaneous SNR and Rx diversity order in accordance with one or more aspects of the present disclosure.

FIG. 9 shows a block diagram 900 of a device 905 that supports adaptive PA order modeling based on instantaneous SNR and Rx diversity order in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations or components thereof may be examples of means for performing various aspects of adaptive PA order modeling based on instantaneous SNR and Rx diversity order as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor (e.g., referred to as a processor-executable code). If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for receiving, from a UE, first information indicating a capability for adaptive PA order modeling based on instantaneous SNR. The communications manager 920 is capable of, configured to, or operable to support a means for transmitting, to the UE and based on the first information, second information indicating a set of recommended kernel set size associations, where the set of recommended kernel set size associations include one or more associations between a quantity of receive antennas, a SNR threshold, and a kernel set size.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for improved communication reliability.

Figure 10:
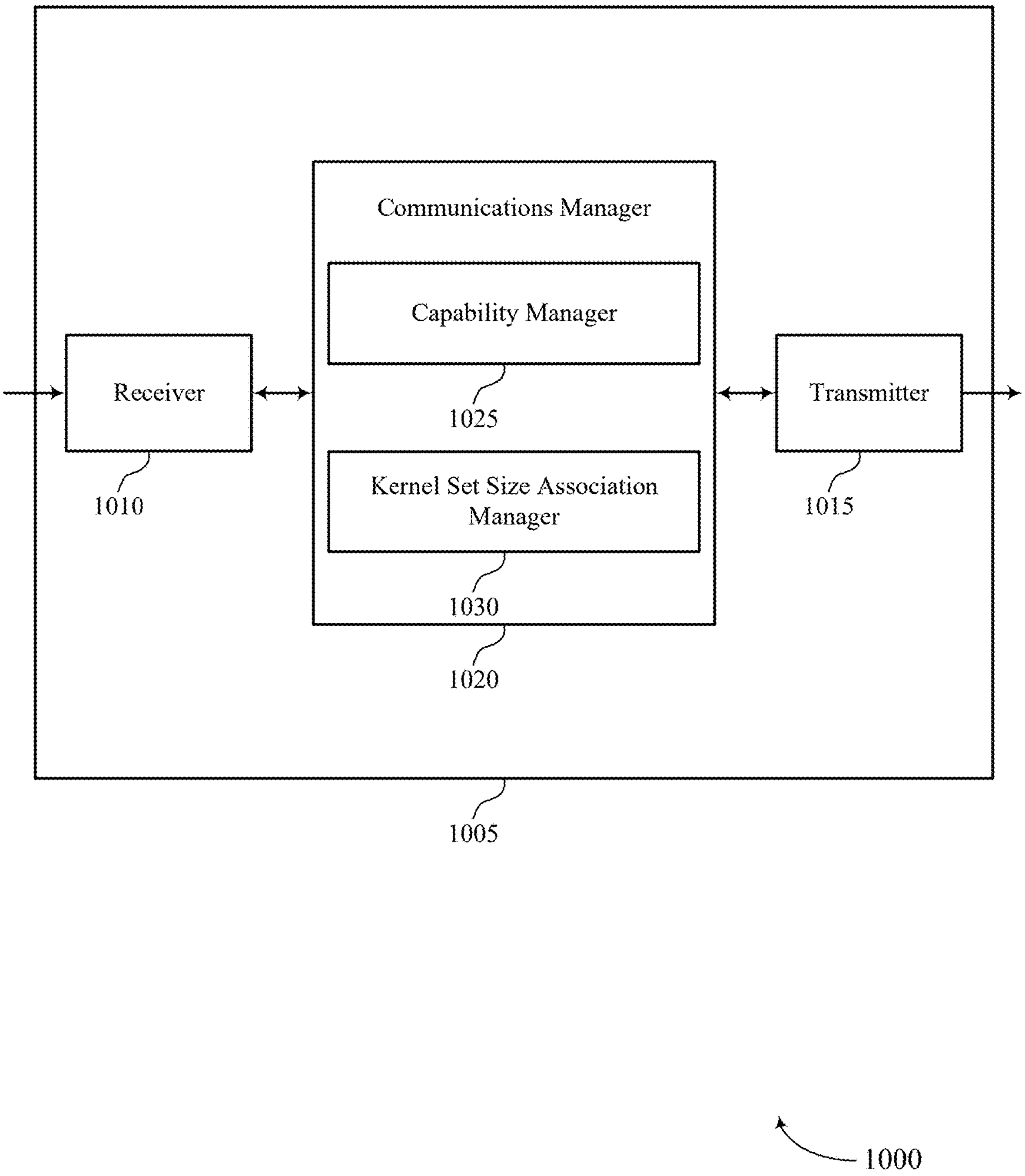

FIG. 10 shows a block diagram 1000 of a device 1005 that supports adaptive PA order modeling based on instantaneous SNR and Rx diversity order in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of adaptive PA order modeling based on instantaneous SNR and Rx diversity order as described herein. For example, the communications manager 1020 may include a capability manager 1025 a kernel set size association manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The capability manager 1025 is capable of, configured to, or operable to support a means for receiving, from a UE, first information indicating a capability for adaptive PA order modeling based on instantaneous SNR. The kernel set size association manager 1030 is capable of, configured to, or operable to support a means for transmitting, to the UE and based on the first information, second information indicating a set of recommended kernel set size associations, where the set of recommended kernel set size associations include one or more associations between a quantity of receive antennas, a SNR threshold, and a kernel set size.

Figure 11:
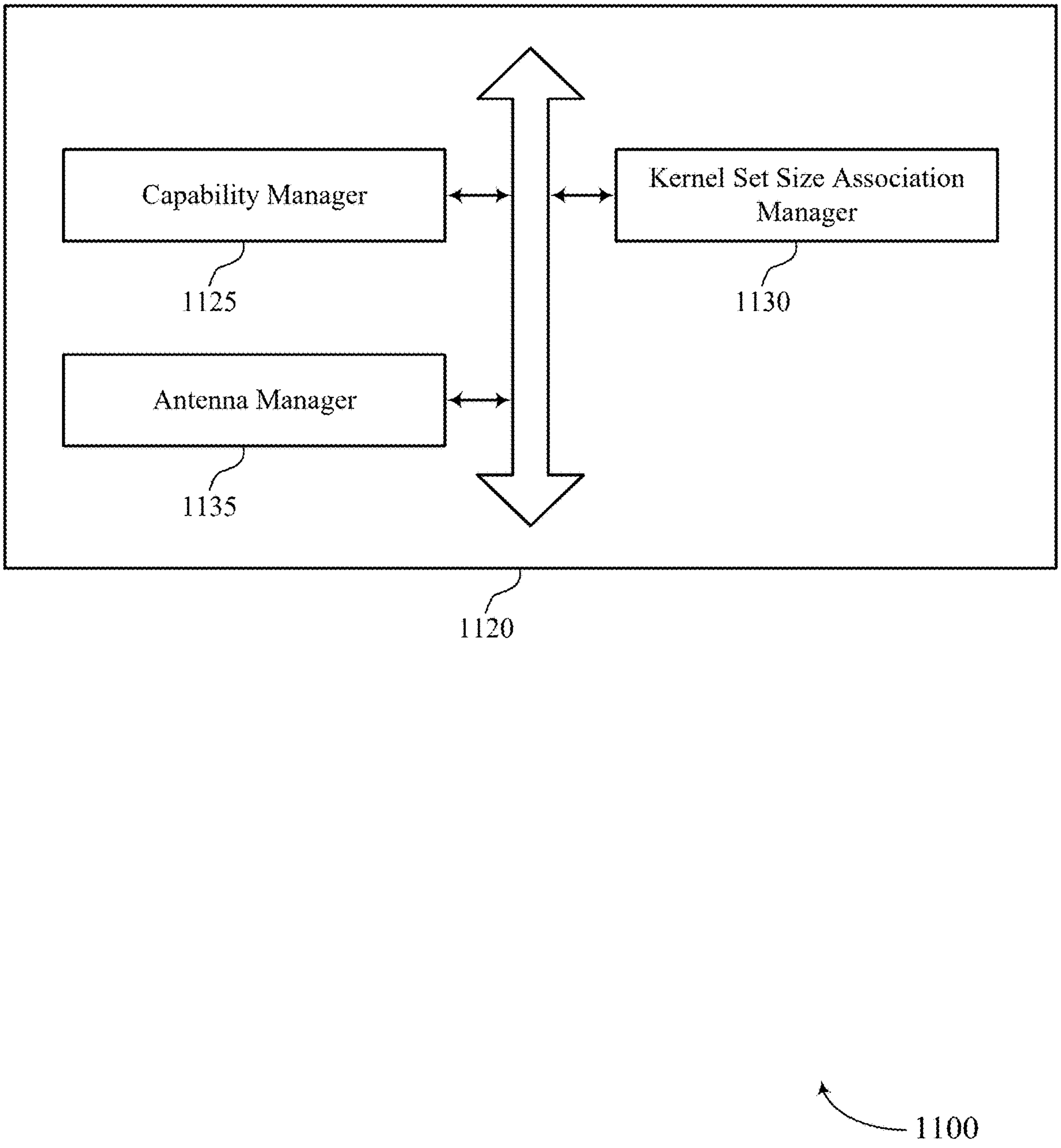
FIG. 11 shows a block diagram of a communications manager that supports adaptive PA order modeling based on instantaneous SNR and Rx diversity order in accordance with one or more aspects of the present disclosure.

FIG. 11 shows a block diagram 1100 of a communications manager 1120 that supports adaptive PA order modeling based on instantaneous SNR and Rx diversity order in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of adaptive PA order modeling based on instantaneous SNR and Rx diversity order as described herein. For example, the communications manager 1120 may include a capability manager 1125, a kernel set size association manager 1130, an antenna manager 1135, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The capability manager 1125 is capable of, configured to, or operable to support a means for receiving, from a UE, first information indicating a capability for adaptive PA order modeling based on instantaneous SNR. The kernel set size association manager 1130 is capable of, configured to, or operable to support a means for transmitting, to the UE and based on the first information, second information indicating a set of recommended kernel set size associations, where the set of recommended kernel set size associations include one or more associations between a quantity of receive antennas, a SNR threshold, and a kernel set size.

In some examples, the kernel set size association manager 1130 is capable of, configured to, or operable to support a means for configuring the set of recommended kernel set size associations based on an EVM value of a PA transfer function estimation for a set of multiple different SNR values and a set of multiple different quantities of receive antennas.

In some examples, the antenna manager 1135 is capable of, configured to, or operable to support a means for receiving, from the UE, an indication of a quantity of active receive antennas at the UE.

In some examples, each association in the set of recommended kernel set size associations transmitted to the UE includes an association between the quantity of active receive antennas for the UE, a signal noise ratio threshold, and a kernel set size.

In some examples, receiving the indication of the quantity of active receive antennas includes receiving the indication of the quantity of active receive antennas via a PUCCH message.

In some examples, receiving the first information indicating the capability for adaptive PA order modeling includes receiving the first information via a MAC-CE.

In some examples, transmitting the second information indicating the set of recommended kernel set size associations includes transmitting the second information via a MAC-CE.

In some examples, the second information includes a lookup table that includes the set of recommended kernel set size associations.

Figure 12:
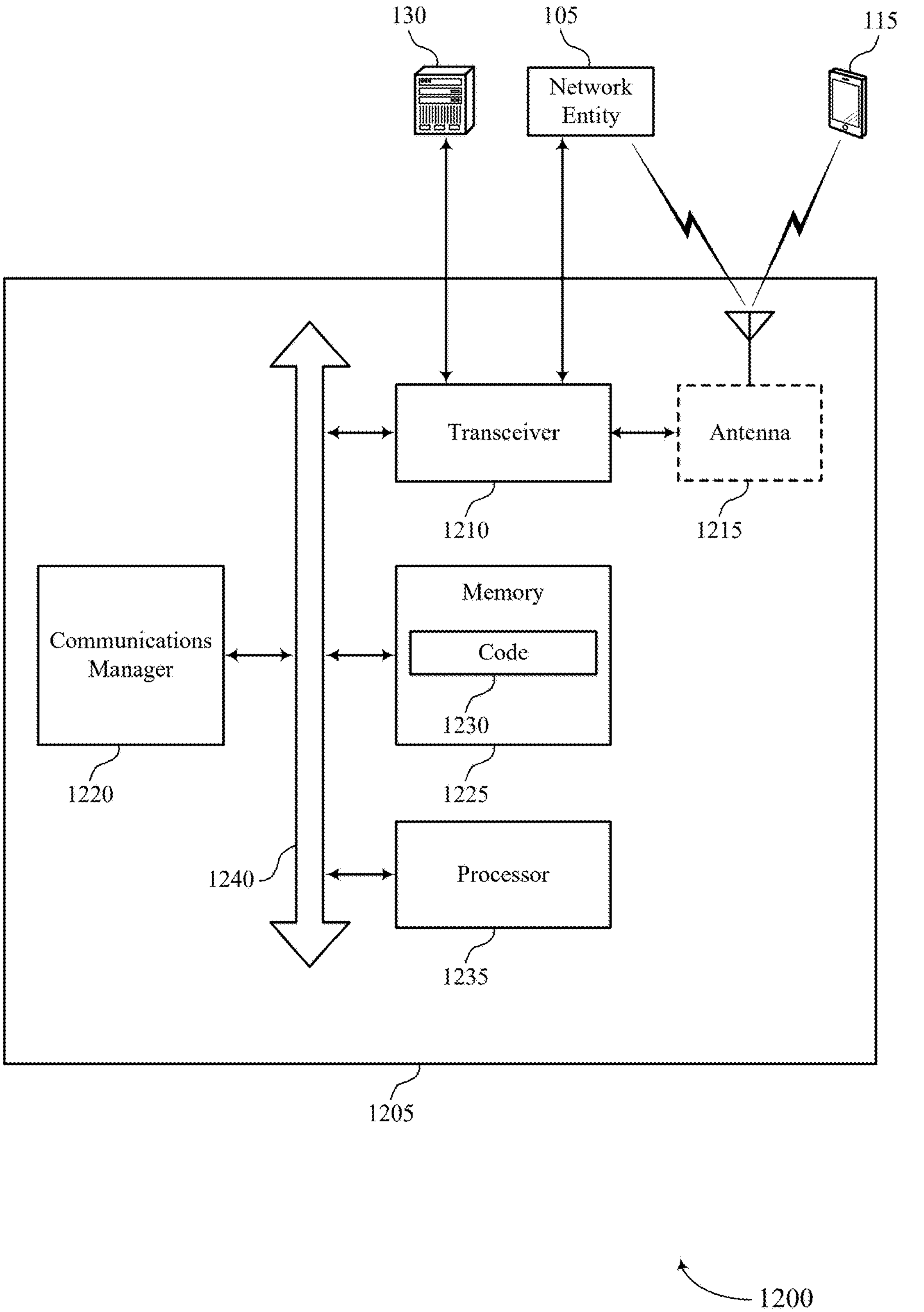
FIG. 12 shows a diagram of a system including a device that supports adaptive PA order modeling based on instantaneous SNR and Rx diversity order in accordance with one or more aspects of the present disclosure.

FIG. 12 shows a diagram of a system 1200 including a device 1205 that supports adaptive PA order modeling based on instantaneous SNR and Rx diversity order in accordance with one or more aspects of the present disclosure. The device 1205 may be an example of or include components of a device 905, a device 1005, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The at least one memory 1225 may include RAM, ROM, or any combination thereof. The at least one memory 1225 may store computer-readable, computer-executable, or processor-executable code, such as the code 1230. The code 1230 may include instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may include, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting adaptive PA order modeling based on instantaneous SNR and Rx diversity order). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network entities 105, and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for receiving, from a UE, first information indicating a capability for adaptive PA order modeling based on instantaneous SNR. The communications manager 1220 is capable of, configured to, or operable to support a means for transmitting, to the UE and based on the first information, second information indicating a set of recommended kernel set size associations, where the set of recommended kernel set size associations include one or more associations between a quantity of receive antennas, a SNR threshold, and a kernel set size.

By including or configuring the communications manager 1220 in accordance with examples as described herein, the device 1205 may support techniques for improved communication reliability and improved throughput.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of adaptive PA order modeling based on instantaneous SNR and Rx diversity order as described herein, or the at least one processor 1235 and the at least one memory 1225 may be otherwise configured to, individually or collectively, perform or support such operations.

Figure 13:
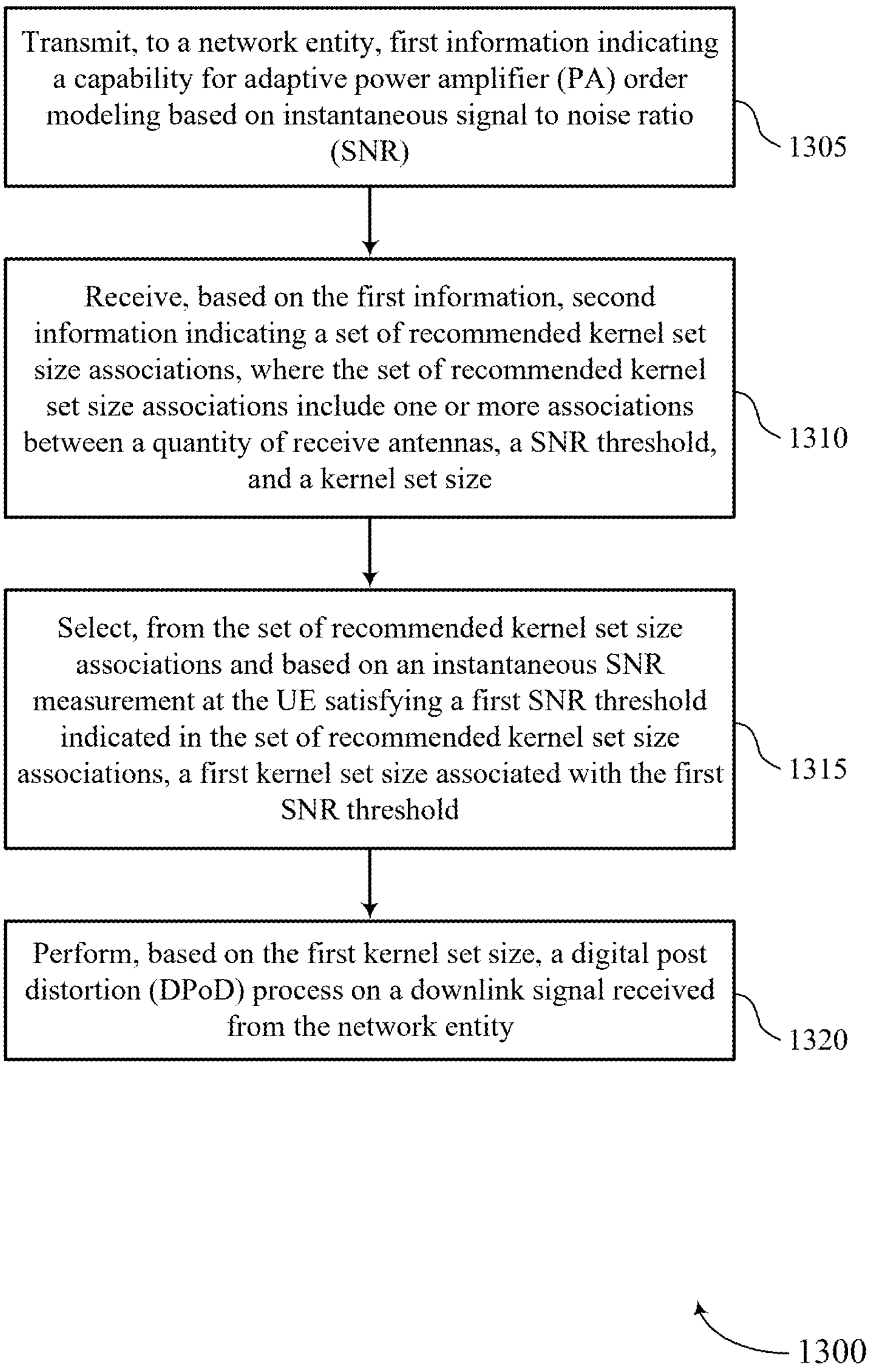

FIG. 13 shows a flowchart illustrating a method 1300 that supports adaptive PA order modeling based on instantaneous SNR and Rx diversity order in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting, to a network entity, first information indicating a capability for adaptive PA order modeling based on instantaneous SNR. The operations of 1305 may be performed in accordance with examples as disclosed herein. In some examples, aspects of the operations of 1305 may be performed by a capability manager 725 as described with reference to FIG. 7.

At 1310, the method may include receiving, based on the first information, second information indicating a set of recommended kernel set size associations, where the set of recommended kernel set size associations include one or more associations between a quantity of receive antennas, a SNR threshold, and a kernel set size. The operations of 1310 may be performed in accordance with examples as disclosed herein. In some examples, aspects of the operations of 1310 may be performed by a kernel set size association manager 730 as described with reference to FIG. 7.

At 1315, the method may include selecting, from the set of recommended kernel set size associations and based on an instantaneous SNR measurement at the UE satisfying a first SNR threshold indicated in the set of recommended kernel set size associations, a first kernel set size associated with the first SNR threshold. The operations of 1315 may be performed in accordance with examples as disclosed herein. In some examples, aspects of the operations of 1315 may be performed by a kernel set size association manager 730 as described with reference to FIG. 7.

At 1320, the method may include performing, based on the first kernel set size, a DPOD process on a downlink signal received from the network entity. The operations of 1320 may be performed in accordance with examples as disclosed herein. In some examples, aspects of the operations of 1320 may be performed by a DPOD manager 735 as described with reference to FIG. 7.

Figure 14:
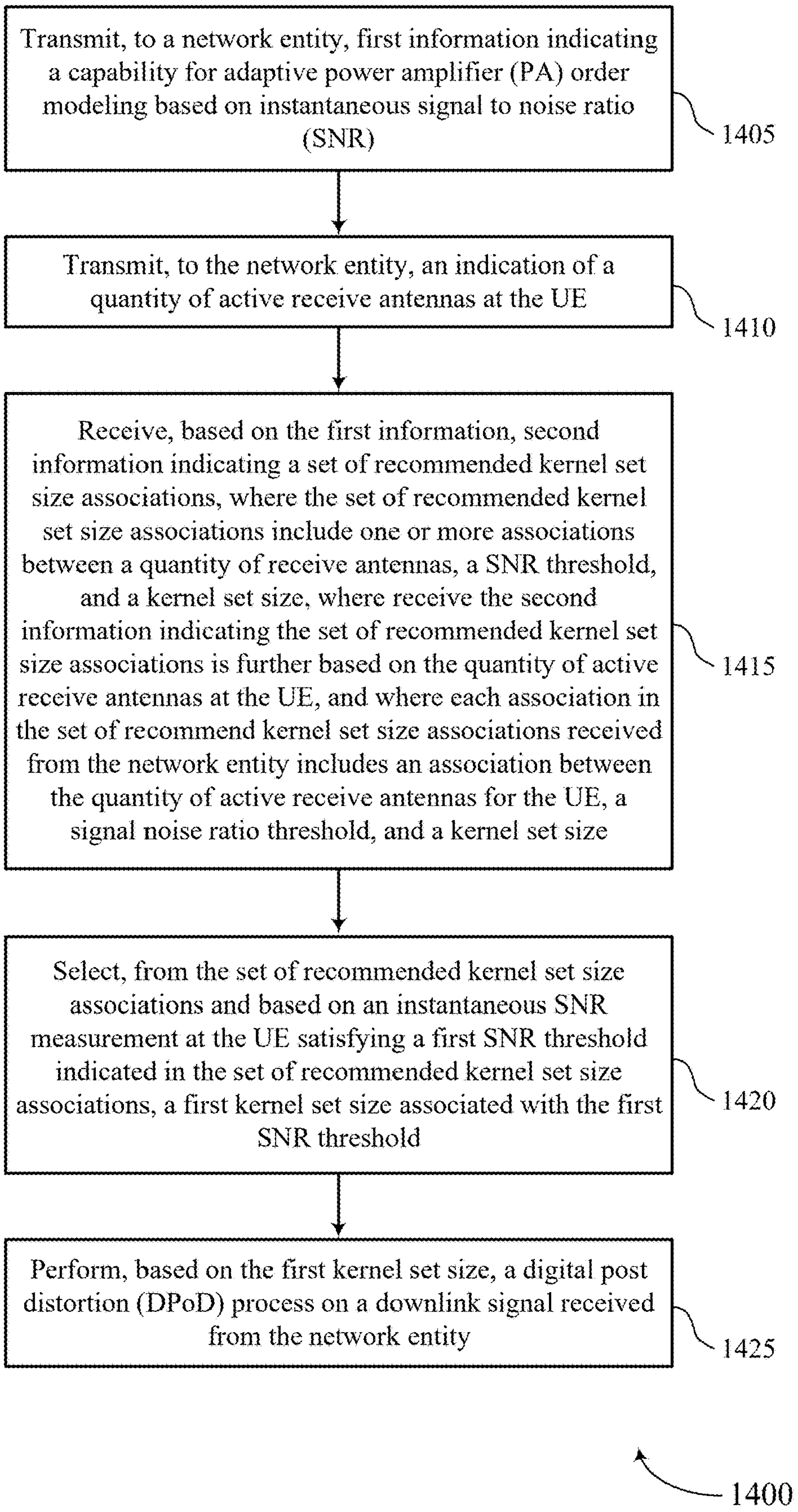

FIG. 14 shows a flowchart illustrating a method 1400 that supports adaptive PA order modeling based on instantaneous SNR and Rx diversity order in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting, to a network entity, first information indicating a capability for adaptive PA order modeling based on instantaneous SNR. The operations of 1405 may be performed in accordance with examples as disclosed herein. In some examples, aspects of the operations of 1405 may be performed by a capability manager 725 as described with reference to FIG. 7.

At 1410, the method may include transmitting, to the network entity, an indication of a quantity of active receive antennas at the UE. The operations of 1410 may be performed in accordance with examples as disclosed herein. In some examples, aspects of the operations of 1410 may be performed by an antenna manager 740 as described with reference to FIG. 7.

At 1415, the method may include receiving, based on the first information, second information indicating a set of recommended kernel set size associations, where the set of recommended kernel set size associations include one or more associations between a quantity of receive antennas, a SNR threshold, and a kernel set size, where receiving the second information indicating the set of recommended kernel set size associations is further based on the quantity of active receive antennas at the UE, and where each association in the set of recommended kernel set size associations received from the network entity includes an association between the quantity of active receive antennas for the UE, a signal noise ratio threshold, and a kernel set size. The operations of 1415 may be performed in accordance with examples as disclosed herein. In some examples, aspects of the operations of 1415 may be performed by a kernel set size association manager 730 as described with reference to FIG. 7.

At 1420, the method may include selecting, from the set of recommended kernel set size associations and based on an instantaneous SNR measurement at the UE satisfying a first SNR threshold indicated in the set of recommended kernel set size associations, a first kernel set size associated with the first SNR threshold. The operations of 1420 may be performed in accordance with examples as disclosed herein. In some examples, aspects of the operations of 1420 may be performed by a kernel set size association manager 730 as described with reference to FIG. 7.

At 1425, the method may include performing, based on the first kernel set size, a DPOD process on a downlink signal received from the network entity. The operations of 1425 may be performed in accordance with examples as disclosed herein. In some examples, aspects of the operations of 1425 may be performed by a DPOD manager 735 as described with reference to FIG. 7.

FIG. 15 shows a flowchart illustrating a method 1500 that supports adaptive PA order modeling based on instantaneous SNR and Rx diversity order in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from a UE, first information indicating a capability for adaptive PA order modeling based on instantaneous SNR. The operations of 1505 may be performed in accordance with examples as disclosed herein. In some examples, aspects of the operations of 1505 may be performed by a capability manager 1125 as described with reference to FIG. 11.

At 1510, the method may include transmitting, to the UE and based on the first information, second information indicating a set of recommended kernel set size associations, where the set of recommended kernel set size associations include one or more associations between a quantity of receive antennas, a SNR threshold, and a kernel set size. The operations of 1510 may be performed in accordance with examples as disclosed herein. In some examples, aspects of the operations of 1510 may be performed by a kernel set size association manager 1130 as described with reference to FIG. 11.

Figure 16:
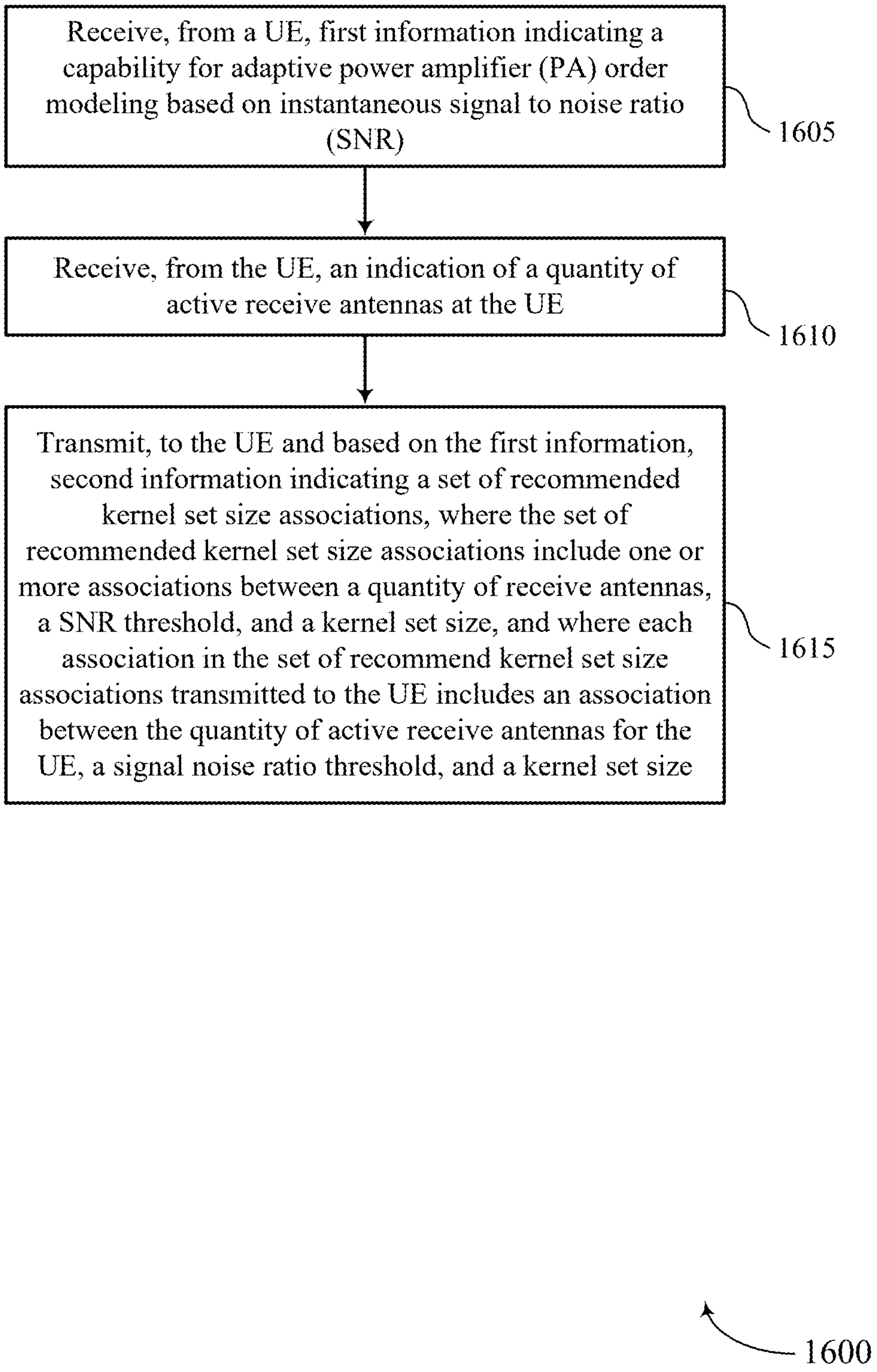

FIG. 16 shows a flowchart illustrating a method 1600 that supports adaptive PA order modeling based on instantaneous SNR and Rx diversity order in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a UE, first information indicating a capability for adaptive PA order modeling based on instantaneous SNR. The operations of 1605 may be performed in accordance with examples as disclosed herein. In some examples, aspects of the operations of 1605 may be performed by a capability manager 1125 as described with reference to FIG. 11.

At 1610, the method may include receiving, from the UE, an indication of a quantity of active receive antennas at the UE. The operations of 1610 may be performed in accordance with examples as disclosed herein. In some examples, aspects of the operations of 1610 may be performed by an antenna manager 1135 as described with reference to FIG. 11.

At 1615, the method may include transmitting, to the UE and based on the first information, second information indicating a set of recommended kernel set size associations, where the set of recommended kernel set size associations include one or more associations between a quantity of receive antennas, a SNR threshold, and a kernel set size, and where each association in the set of recommended kernel set size associations transmitted to the UE includes an association between the quantity of active receive antennas for the UE, a signal noise ratio threshold, and a kernel set size. The operations of 1615 may be performed in accordance with examples as disclosed herein. In some examples, aspects of the operations of 1615 may be performed by a kernel set size association manager 1130 as described with reference to FIG. 11.

The following provides an overview of aspects of the present disclosure:

Aspect 1: A method for wireless communications by a UE, comprising: transmitting, to a network entity, first information indicating a capability for adaptive power amplifier (PA) order modeling based on instantaneous signal to noise ratio (SNR); receiving, based at least in part on the first information, second information indicating a set of recommended kernel set size associations, wherein the set of recommended kernel set size associations comprise one or more associations between a quantity of receive antennas, a SNR threshold, and a kernel set size; selecting, from the set of recommended kernel set size associations and based at least in part on an instantaneous SNR measurement at the UE satisfying a first SNR threshold indicated in the set of recommended kernel set size associations, a first kernel set size associated with the first SNR threshold; and performing, based at least in part on the first kernel set size, a digital post distortion (DPOD) process on a downlink signal received from the network entity.

Aspect 2: The method of aspect 1, wherein the first kernel set size is selected from the set of recommended kernel set size associations based at least in part on a quantity of active receive antennas at the UE.

Aspect 3: The method of any of aspects 1 through 2, further comprising: transmitting, to the network entity, an indication of a quantity of active receive antennas at the UE, wherein receiving the second information indicating the set of recommended kernel set size associations is further based at least in part on the quantity of active receive antennas at the UE, and wherein each association in the set of recommended kernel set size associations received from the network entity comprises an association between the quantity of active receive antennas for the UE, a signal noise ratio threshold, and a kernel set size.

Aspect 4: The method of aspect 3, further comprising: transmitting, based at least in part on detecting a change in the quantity of active receive antennas, an updated indication of an updated quantity of active receive antennas; receiving, based at least in part on the updated indication, updated second information indicating an updated set of recommended kernel set size associations; and performing, based at least in part on a second kernel set size selected from the updated set of recommended kernel set size associations and on a second instantaneous SNR measurement at the UE, the digital post distortion (DPOD) process on a second downlink signal received from the network entity.

Aspect 5: The method of aspect 4, further comprising: detecting the change in the quantity of active receive antennas based at least in part on detection of an interfering signal from a neighboring network entity, a determination that the UE has switched to a battery-saving mode, or detection of a change in a detection and demodulation technique.

Aspect 6: The method of any of aspects 3 through 5, wherein the indication of the quantity of active receive antennas is transmitted via a PUCCH message.

Aspect 7: The method of any of aspects 1 through 6, wherein the first information is transmitted via a medium access control-control element (MAC-CE).

Aspect 8: The method of any of aspects 1 through 7, wherein the second information is received via a medium access control-control element (MAC-CE).

Aspect 9: The method of any of aspects 1 through 8, wherein the second information comprises a lookup table that includes the set of recommended kernel set size associations.

Aspect 10: A method for wireless communications by a network entity, comprising: receiving, from a UE, first information indicating a capability for adaptive power amplifier (PA) order modeling based on instantaneous signal to noise ratio (SNR); and transmitting, to the UE and based at least in part on the first information, second information indicating a set of recommended kernel set size associations, wherein the set of recommended kernel set size associations comprise one or more associations between a quantity of receive antennas, a SNR threshold, and a kernel set size.

Aspect 11: The method of aspect 10, further comprising: configuring the set of recommended kernel set size associations based at least in part on an error vector magnitude (EVM) value of a PA transfer function estimation for a plurality of different SNR values and a plurality of different quantities of receive antennas.

Aspect 12: The method of any of aspects 10 through 11, further comprising: receiving, from the UE, an indication of a quantity of active receive antennas at the UE, wherein each association in the set of recommended kernel set size associations transmitted to the UE comprises an association between the quantity of active receive antennas for the UE, a signal noise ratio threshold, and a kernel set size.

Aspect 13: The method of aspect 12, wherein the indication of the quantity of active receive antennas is received via a PUCCH message.

Aspect 14: The method of any of aspects 10 through 13, wherein the first information is received via a medium access control-control element (MAC-CE).

Aspect 15: The method of any of aspects 10 through 14, wherein the second information is transmitted via a medium access control-control element (MAC-CE).

Aspect 16: The method of any of aspects 10 through 15, wherein the second information comprises a lookup table that includes the set of recommended kernel set size associations.

Aspect 17: A UE for wireless communications, comprising one or more memories storing processor-executable code, and one or more processors coupled with the one or more memories and individually or collectively operable to execute the code to cause the UE to perform a method of any of aspects 1 through 9.

Aspect 18: A UE for wireless communications, comprising at least one means for performing a method of any of aspects 1 through 9.

Aspect 19: A non-transitory computer-readable medium storing code for wireless communications, the code comprising instructions executable by one or more processors to perform a method of any of aspects 1 through 9.

Aspect 20: A network entity for wireless communications, comprising one or more memories storing processor-executable code, and one or more processors coupled with the one or more memories and individually or collectively operable to execute the code to cause the network entity to perform a method of any of aspects 10 through 16.

Aspect 21: A network entity for wireless communications, comprising at least one means for performing a method of any of aspects 10 through 16.

Aspect 22: A non-transitory computer-readable medium storing code for wireless communications, the code comprising instructions executable by one or more processors to perform a method of any of aspects 10 through 16.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

transmit, to a network entity, first information indicating a capability for adaptive power amplifier (PA) order modeling based on instantaneous signal to noise ratio (SNR);

receive, based at least in part on the first information, second information indicating a set of recommended kernel set size associations, wherein the set of recommended kernel set size associations comprise one or more associations between a quantity of receive antennas, a SNR threshold, and a kernel set size;

select, from the set of recommended kernel set size associations and based at least in part on an instantaneous SNR measurement at the UE satisfying a first SNR threshold indicated in the set of recommended kernel set size associations, a first kernel set size associated with the first SNR threshold; and perform, based at least in part on the first kernel set size, a digital post distortion (DPOD) process on a downlink signal received from the network entity.

2. The UE of claim 1, wherein the first kernel set size is selected from the set of recommended kernel set size associations based at least in part on a quantity of active receive antennas at the UE.

3. The UE of claim 1, wherein the one or more processors are individually or collectively further operable to execute the code to cause the UE to:

transmit, to the network entity, an indication of a quantity of active receive antennas at the UE, wherein receipt of the second information indicating the set of recommended kernel set size associations is further based at least in part on the quantity of active receive antennas at the UE, and wherein each association in the set of recommend kernel set size associations received from the network entity comprises an association between the quantity of active receive antennas for the UE, a signal noise ratio threshold, and a kernel set size.

4. The UE of claim 3, wherein the one or more processors are individually or collectively further operable to execute the code to cause the UE to:
transmit, based at least in part on detection of a change in the quantity of active receive antennas, an updated indication of an updated quantity of active receive antennas;
receive, based at least in part on the updated indication, updated second information indicating an updated set of recommended kernel set size associations; and
perform, based at least in part on a second kernel set size selected from the updated set of recommended kernel set size associations and on a second instantaneous SNR measurement at the UE, the DPOD process on a second downlink signal received from the network entity.

5. The UE of claim 4, wherein the one or more processors are individually or collectively further operable to execute the code to cause the UE to:
detect the change in the quantity of active receive antennas based at least in part on detection of an interfering signal from a neighboring network entity, a determination that the UE has switched to a battery-saving mode, or detection of a change in a detection and demodulation technique.

6. The UE of claim 3, wherein the indication of the quantity of active receive antennas is transmitted via a physical uplink control channel (PUCCH) message.

7. The UE of claim 1, wherein the first information is transmitted via a medium access control-control element (MAC-CE).

8. The UE of claim 1, wherein the second information is received via a medium access control-control element (MAC-CE).

9. The UE of claim 1, wherein the second information comprises a lookup table that includes the set of recommended kernel set size associations.

10. A network entity, comprising:
one or more memories storing processor-executable code; and
one or more processors coupled with the one or more memories and individually or collectively operable to execute the code to cause the network entity to:
receive, from a user equipment (UE), first information indicating a capability for adaptive power amplifier (PA) order modeling based on instantaneous signal to noise ratio (SNR); and
transmit, to the UE and based at least in part on the first information, second information indicating a set of recommended kernel set size associations, wherein the set of recommended kernel set size associations comprise one or more associations between a quantity of receive antennas, a SNR threshold, and a kernel set size.

11. The network entity of claim 10, wherein the one or more processors are individually or collectively further operable to execute the code to cause the network entity to:
configure the set of recommended kernel set size associations based at least in part on an error vector magnitude (EVM) value of a PA transfer function estimation for a plurality of different SNR values and a plurality of different quantities of receive antennas.

12. The network entity of claim 10, wherein the one or more processors are individually or collectively further operable to execute the code to cause the network entity to:
receive, from the UE, an indication of a quantity of active receive antennas at the UE,
wherein each association in the set of recommend kernel set size associations transmitted to the UE comprises an association between the quantity of active receive antennas for the UE, a signal noise ratio threshold, and a kernel set size.

13. The network entity of claim 12, wherein the indication of the quantity of active receive antennas is received via a physical uplink control channel (PUCCH) message.

14. The network entity of claim 10, wherein the first information is received via a medium access control-control element (MAC-CE).

15. The network entity of claim 10, wherein the second information is transmitted via a medium access control-control element (MAC-CE).

16. The network entity of claim 10, wherein the second information comprises a lookup table that includes the set of recommended kernel set size associations.

17. A method for wireless communications by a user equipment (UE), comprising:
transmitting, to a network entity, first information indicating a capability for adaptive power amplifier (PA) order modeling based on instantaneous signal to noise ratio (SNR);
receiving, based at least in part on the first information, second information indicating a set of recommended kernel set size associations, wherein the set of recommended kernel set size associations comprise one or more associations between a quantity of receive antennas, a SNR threshold, and a kernel set size;
selecting, from the set of recommended kernel set size associations and based at least in part on an instantaneous SNR measurement at the UE satisfying a first SNR threshold indicated in the set of recommended kernel set size associations, a first kernel set size associated with the first SNR threshold; and
performing, based at least in part on the first kernel set size, a digital post distortion (DPOD) process on a downlink signal received from the network entity.

18. The method of claim 17, wherein the first kernel set size is selected from the set of recommended kernel set size associations based at least in part on a quantity of active receive antennas at the UE.

19. The method of claim 17, further comprising:
transmitting, to the network entity, an indication of a quantity of active receive antennas at the UE,
wherein receiving the second information indicating the set of recommended kernel set size associations is further based at least in part on the quantity of active receive antennas at the UE, and
wherein each association in the set of recommended kernel set size associations received from the network entity comprises an association between the quantity of active receive antennas for the UE, a signal noise ratio threshold, and a kernel set size.

20. The method of claim 19, further comprising:
transmitting, based at least in part on detecting a change in the quantity of active receive antennas, an updated indication of an updated quantity of active receive antennas;
receiving, based at least in part on the updated indication, updated second information indicating an updated set of recommended kernel set size associations; and
performing, based at least in part on a second kernel set size selected from the updated set of recommended kernel set size associations and on a second instantaneous SNR measurement at the UE, the digital post distortion (DPOD) process on a second downlink signal received from the network entity.

21. The method of claim 20, further comprising:

detecting the change in the quantity of active receive antennas based at least in part on detecting an interfering signal from a neighboring network entity, determining that the UE has switched to a battery-saving mode, or detecting a change in a detection and demodulation technique.

22. The method of claim 19, wherein the indication of the quantity of active receive antennas is transmitted via a physical uplink control channel (PUCCH) message.

23. The method of claim 17, wherein the first information is transmitted via a medium access control-control element (MAC-CE).

24. The method of claim 17, wherein the second information comprises a lookup table that includes the set of recommended kernel set size associations.

25. A method for wireless communications by a network entity, comprising:

receiving, from a user equipment (UE), first information indicating a capability for adaptive power amplifier (PA) order modeling based on instantaneous signal to noise ratio (SNR); and transmitting, to the UE and based at least in part on the first information, second information indicating a set of recommended kernel set size associations, wherein the set of recommended kernel set size associations comprise one or more associations between a quantity of receive antennas, a SNR threshold, and a kernel set size.

26. The method of claim 25, further comprising:

configuring the set of recommended kernel set size associations based at least in part on an error vector magnitude (EVM) value of a PA transfer function estimation for a plurality of different SNR values and a plurality of different quantities of receive antennas.

27. The method of claim 25, further comprising:

receiving, from the UE, an indication of a quantity of active receive antennas at the UE, wherein each association in the set of recommended kernel set size associations transmitted to the UE comprises an association between the quantity of active receive antennas for the UE, a signal noise ratio threshold, and a kernel set size.

28. The method of claim 27, wherein the indication of the quantity of active receive antennas is received via a physical uplink control channel (PUCCH) message.

29. The method of claim 25, wherein the first information is received via a medium access control-control element (MAC-CE).

30. The method of claim 25, wherein the second information comprises a lookup table that includes the set of recommended kernel set size associations.

* * * * *